| PROCESSING ELEMENT | TYPE OF ELEMENT | SYMBOL IN FIELD 123 WHICH REPRESENTS THE PARTICULAR TYPE OF ELEMENT |
|---|---|---|
| A | ADDITION, MULTIPLICATION | 110 |
| B | ADDITION, MULTIPLICATION | 110 |
| C | LOGICAL OPERATOR | 010 |
| D | INPUT, OUTPUT | 001 |
| E | GENERAL PURPOSE COMPUTER | 100 |

INVENTOR
ADIN D. FALKOFF

BY Elmer W. Galbi
ATTORNEY

MAIN MEMORY SEQUENCE CONTROL 400

FIG. 10 OUTPUT OF TIMER 821

United States Patent Office 3,229,260
Patented Jan. 11, 1966

3,229,260

MULTIPROCESSING COMPUTER SYSTEM

Adin D. Falkoff, New Haven, Conn., assignor to International Business Machines Corporation, New York, N.Y., a corporation of New York Filed Mar. 2, 1962, Ser. No. 176,940
13 Claims. (Cl. 340—172.5)

This invention relates to digital computers and more particularly to digital computers which are capable of simultaneously operating upon several interdependent or independent instruction sequences.

Computing systems known in the prior art have been capable of simultaneously operating upon several interdependent or independent instruction sequences, that is, multiprocessing. Such systems require a supervisory program which controls the progress of the various instruction sequences through the system. The complexity of the supervisory program depends upon the degree to which the execution of the various instruction sequences is integrated in the system. If, with the systems of the prior art, an attempt is made to have a high degree of simultaneity relative to the execution of several instruction sequences, the supervisory program becomes complex and a large amount of the system's time is consumed by the supervisory program in order to perform the necessary transfer and control functions (i.e., the necessary housekeeping operations). Some of the transfer and control operations can be taken care of by a compiler program rather than by a supervisory program; however, if this is done, the system will lack flexibility and furthermore, the compiler program must be made complex thus occupying more of the system's time.

Stated differently, with the systems of the prior art, if a system is merely executing one instruction sequence, practically the entire capabilities of the system can be devoted to executing this one instruction sequence; however, if a system is simultaneously executing two or more interdependent or independent instruction sequences, a considerable amount of the system's time must be devoted to housekeeping operations. Furthermore, the multiprocessing systems known in the prior art do not make efficient use of all of the hardware in the system. The present invention is directed at a computing system which can simultaneously execute a plurality of interdependent or independent instruction sequences, and wherein the progress of the various instruction sequences being executed by the system at any one time is not established by a compiler program or controlled by a supervisory program.

The system of the present invention includes a plurality of autonomous computing elements and an associate memory. Each autonomous computing element is essentially a computer which after it has been given an instruction is capable of independently operating upon the instruction to generate a specified result. Each autonomous computing element may be a simple computing element such as an adder which is merely capable of requesting an instruction and after it has been given an instruction of obtaining an augend and an addend from memory, generating their sum, placing the sum in memory and then requesting another instruction. On the other hand, certain of the autonomous computing elements may be complex computing systems which, once they have been given an instruction, are capable of operating independently using subroutines which are stored within the elements.

With the present system, a plurality of interdependent or independent instruction sequences (hereinafter termed programs) are stored in the associative memory. Each of these programs consists of a plurality of instruction words which must be operated upon in some established sequence. The instruction words of the various programs may be intermixed in the memory, that is, it is not required that all of the instructions of one program be stored in sequential locations in the memory.

Each instruction includes in addition to an indication of the particular operation which is to be performed (1) a first field which identifies the program with which the particular instruction is associated, (2) a second field which identifies the position which the particular instruction occupies in the sequence of instructions which form the particular program with which the particular instruction is associated, and (3) a third field which identifies the particular type of computing element needed in order to execute the particular instruction. The system includes means for identifying when a particular instruction is ready for execution.

Whenever an autonomous computing element becomes idle, it interrogates the memory to find an instruction which is then ready for execution and which by the information in its third field contains an indication that it can be executed by the particular autonomous computing element which is interrogating the memory. If such an instruction is found, it is sent to the particular element for execution. After an element completes the execution of an instruction, the system indicates that the next instruction which is in the same program as the completed instruction is ready for execution. This next instruction will remain in memory until an autonomous computing element which is capable of executing the particular instruction becomes idle and interrogates the memory to find an instruction which it can execute. Therefore, it can be seen that the instructions in a particular sequence need not all be executed by the same autonomous computing element.

One of the reasons that the first and second fields in each instruction word (i.e., the fields which identify the particular program with which the instruction is associated and the particular location of the instruction in the particular program) are needed is so that after each instruction has been executed, the system will know which other instruction is thereby made ready for execution.

An object of the present invention is to provide an improved computing system.

A further object of the present invention is to provide a computing system which is capable of simultaneously operating upon a plurality of independent programs.

Yet another object of the present invention is to provide a computing system which has a plurality of autonomous computing elements in which all information relating to the sequence and progress of a program during execution is held in a memory which is common to all autonomous computing elements.

Still another object of the present invention is to provide a computing system with a plurality of autonomous computing elements each of which can work independently on any one of a plurality of stored programs as the condition of these programs requires and dictates.

Yet another object of the present invention is to provide a system which allows program sequences to fan-out and fan-in merely as a result of the information stored in the instruction words themselves.

Yet another object of the present invention is to provide a multiprocessing system in which the hardware in the system is used in the most efficient manner possible in order to process a plurality of programs.

Yet another object of the present invention is to provide a multiprocessing system in which the hardware in the system is used in the most efficient manner possible in order to process a plurality of programs in a priority order established by information in the instruction words of the programs.

Yet another object of the present invention is to provide a computing system which can be easily expanded or contracted as required.

Yet another object of the present invention is to provide a computing system which is adapted to be manufactured in the modular concept with independent replaceable units.

The foregoing and other objects, features and advantages of the invention will be apparent from the following more particular description of preferred embodiments of the invention, as illustrated in the accompanying drawings.

In the drawings:

FIGURE 1*a* is an information flow diagram which shows the overall organization of the system.

FIGURE 1*b* is a chart which specifies the general characteristics of the processing elements as shown in FIGURE 1*a*.

FIGURE 1*c* is a diagram which shows the format of an instruction word.

FIGURE 1*d* is a diagram which shows the format of a data word.

FIGURE 1*e* is a diagram which shows four instruction words which are in the instruction ready memory at one particular time.

FIGURES 2*a*, 2*b*, 2*c*, 2*d* and 2*e* (which fit together as shown in FIGURE 2) are an overall circuit diagram of the system.

FIGURE 3 is a detailed circuit diagram of the instruction memory sequence control circuit shown in FIGURE 2*a*.

FIGURE 4*a* and 4*b* (which fit together as shown in FIGURE 4) are detailed circuit diagrams of the main memory sequence control circuit shown in FIGURE 2*a*.

Figures 1A, 1B:
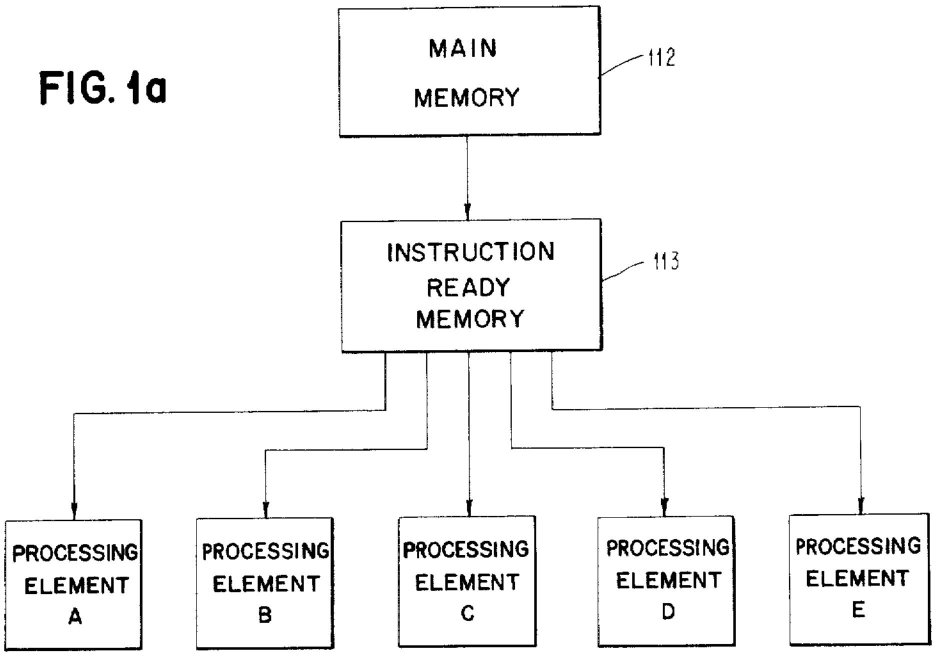
Figures 2, 2A:
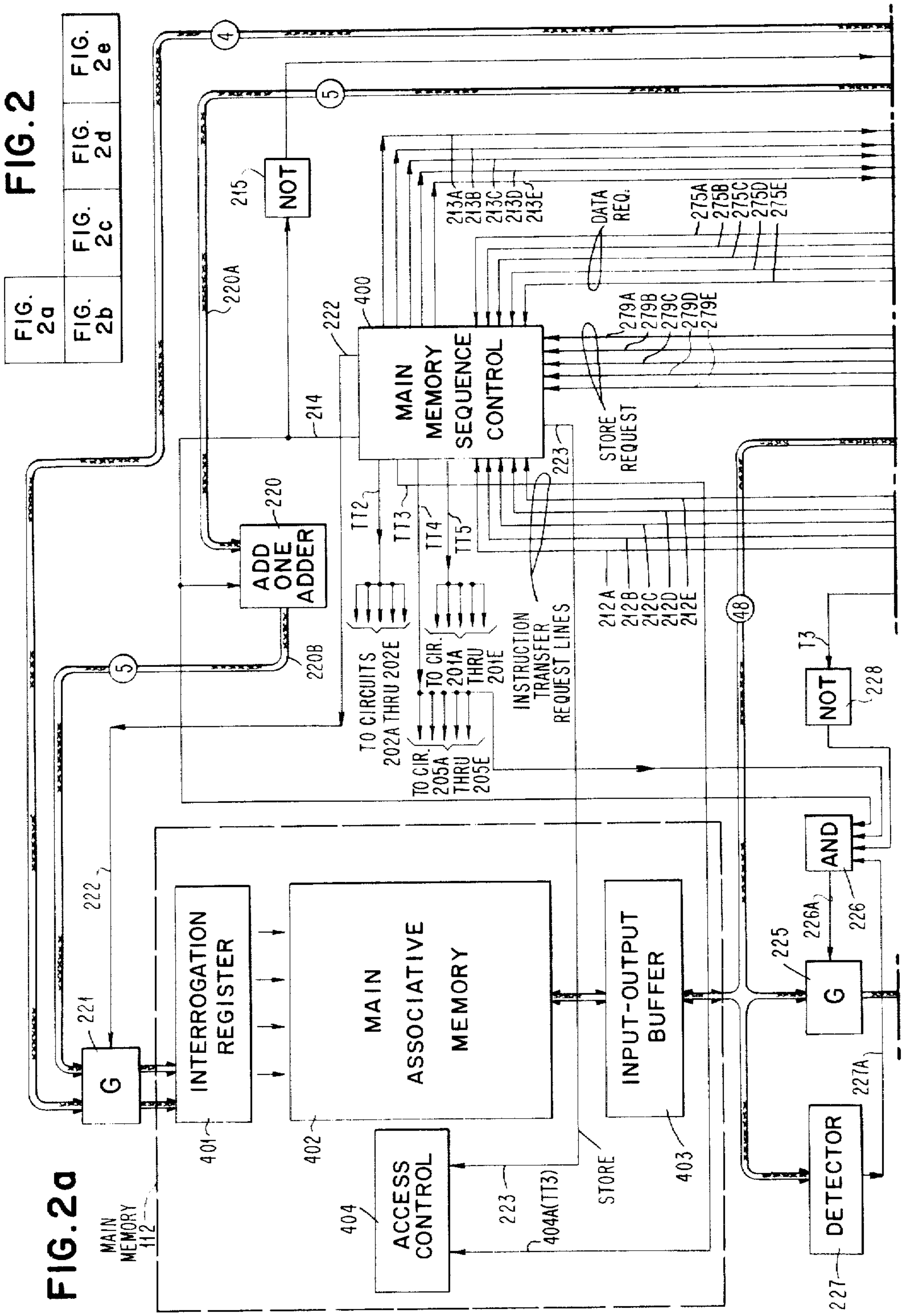
Figure 2B:
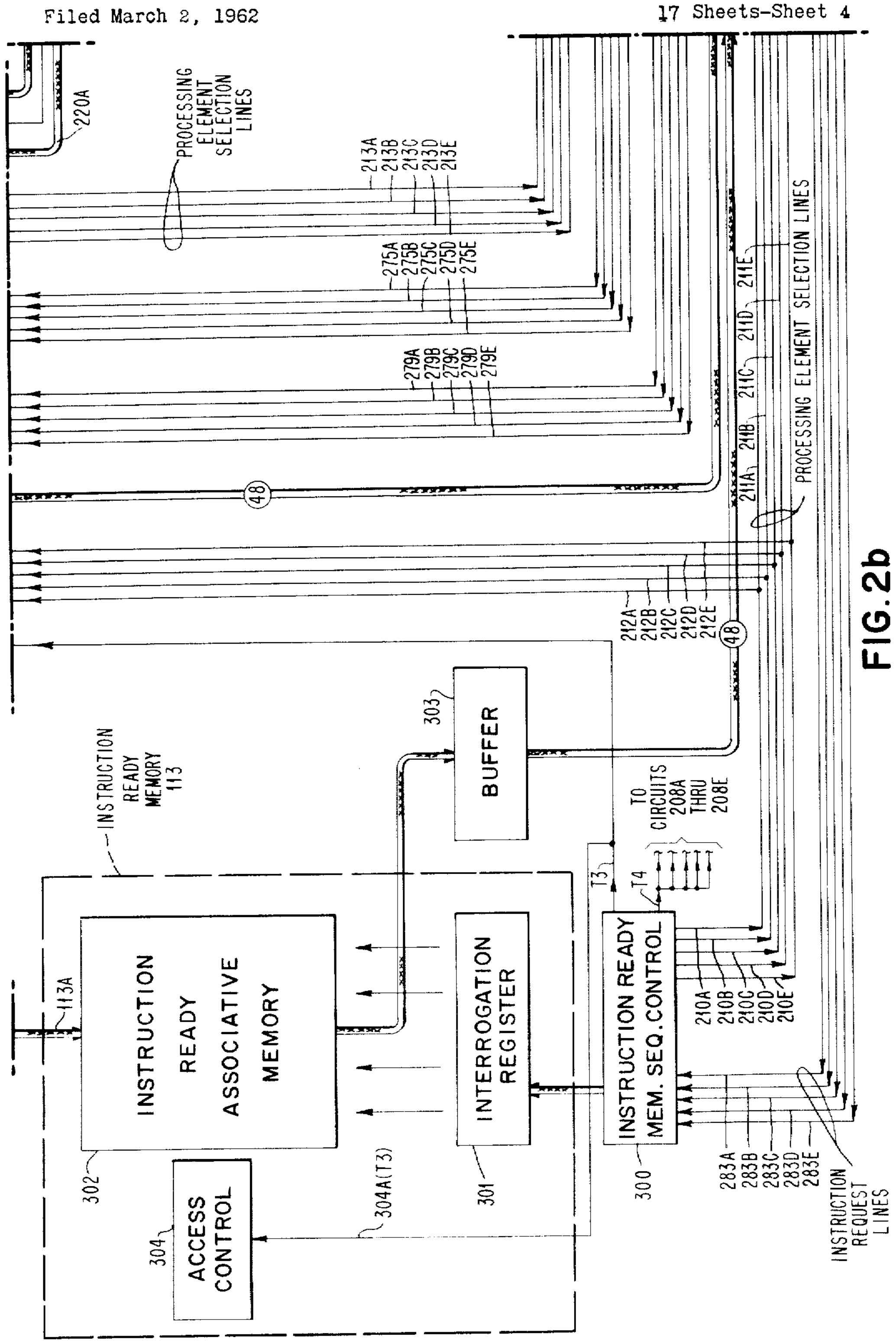
Figure 2C:
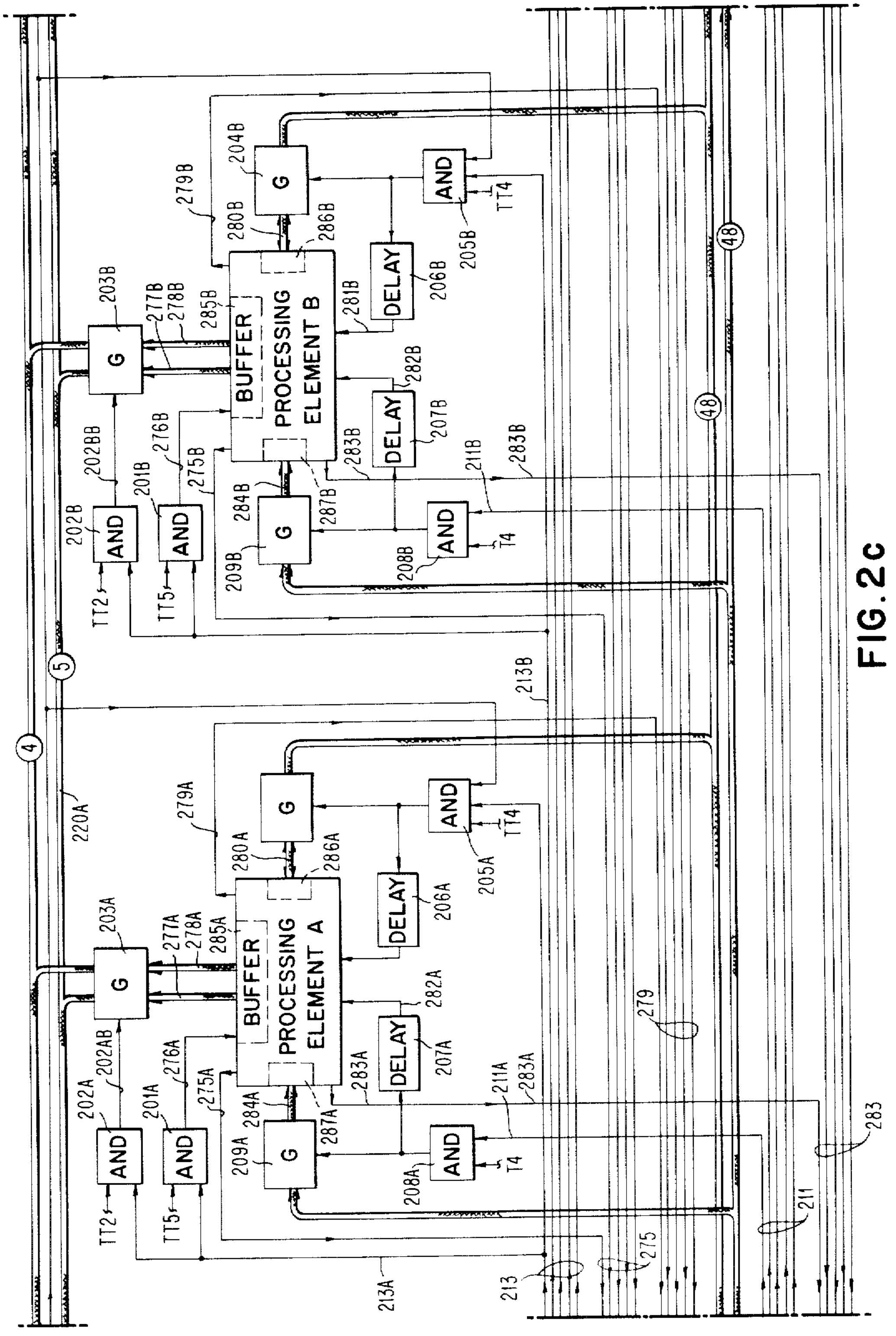
Figures 7, 7A:
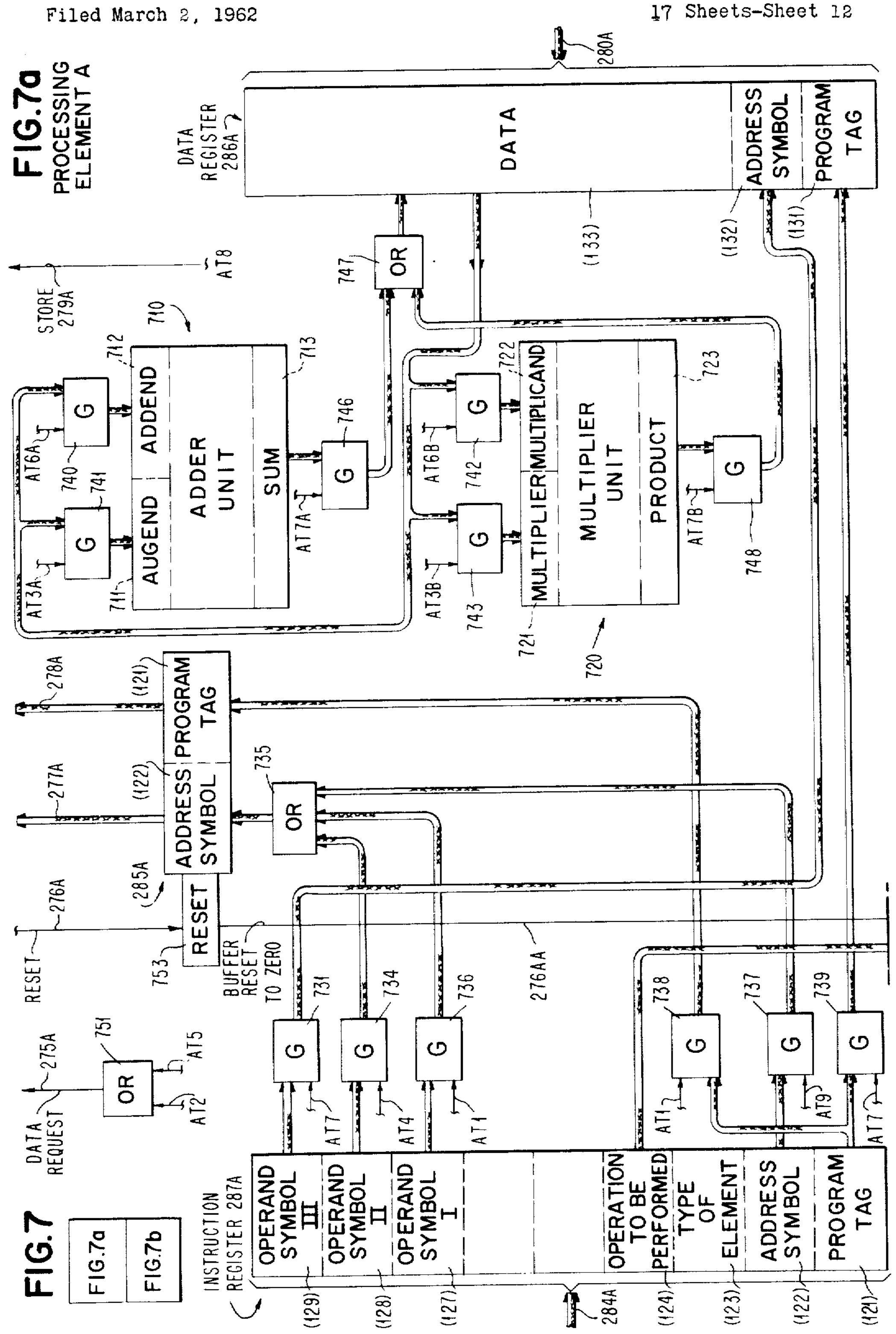
Figure 7B:
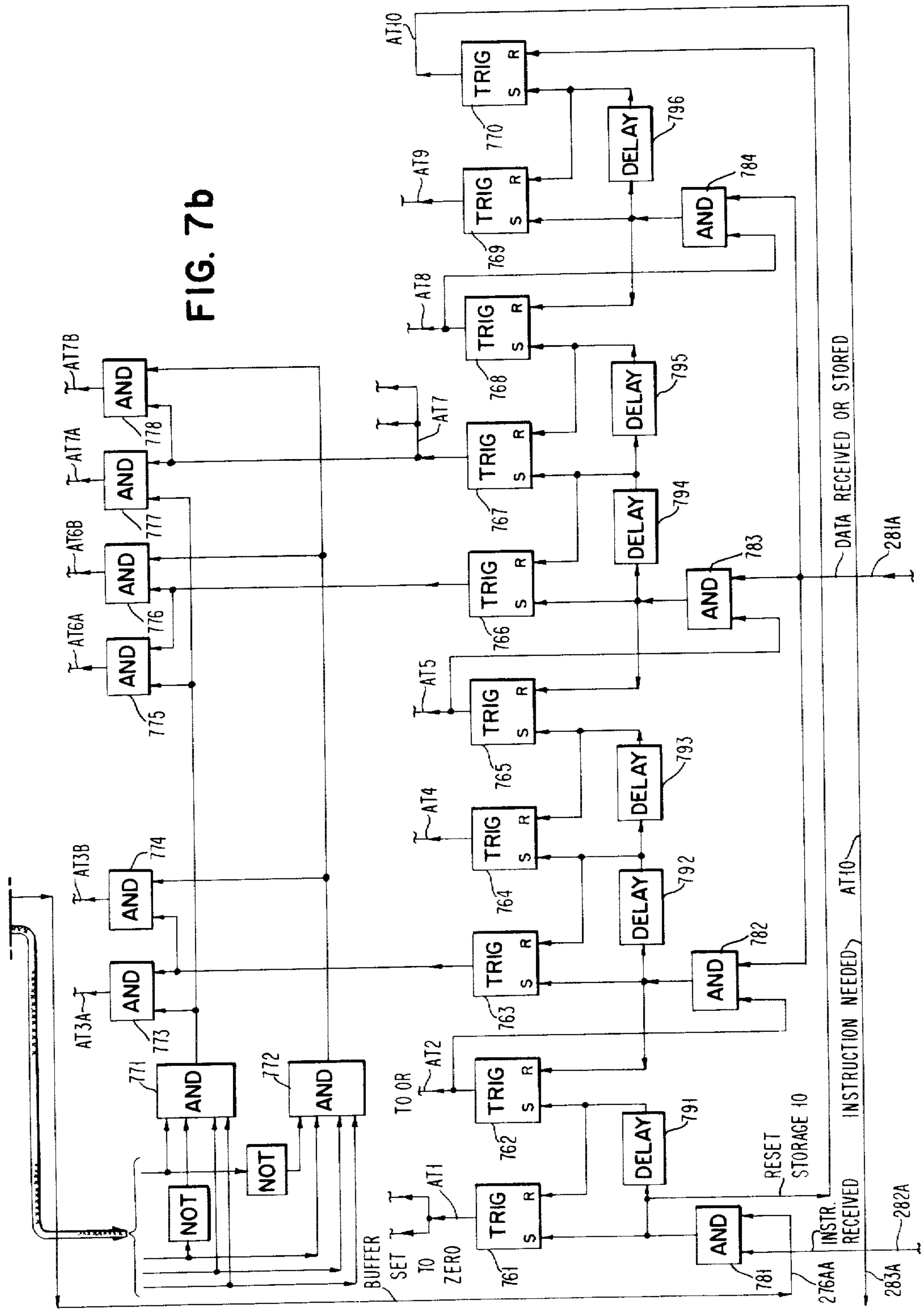

FIGURES 7*a* and 7*b* (which fit together as shown in FIGURE 7) are circuit diagrams of processing element A which is shown in FIGURES 1*a* and 2*c*.

Figure 2D:
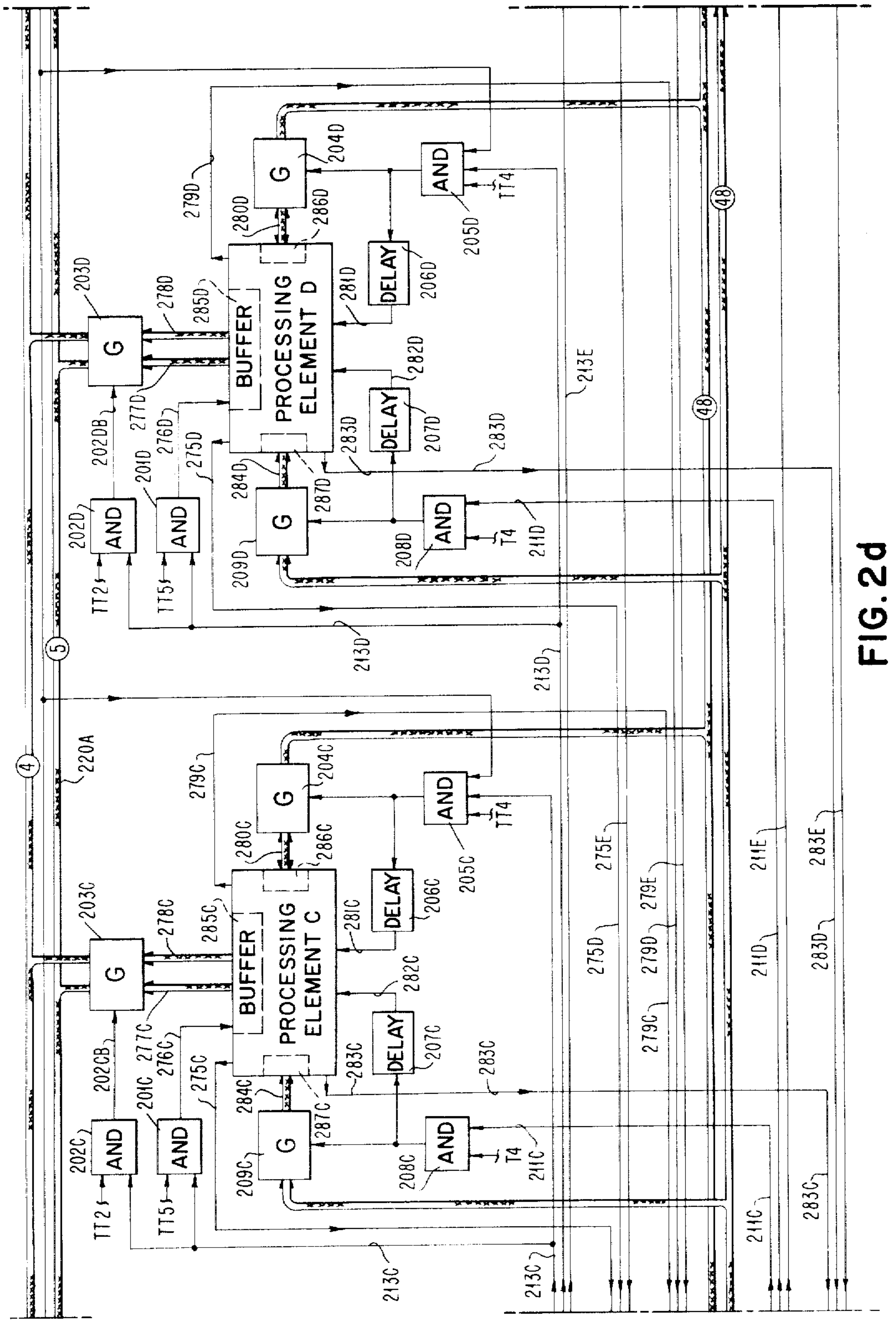
Figure 2E:
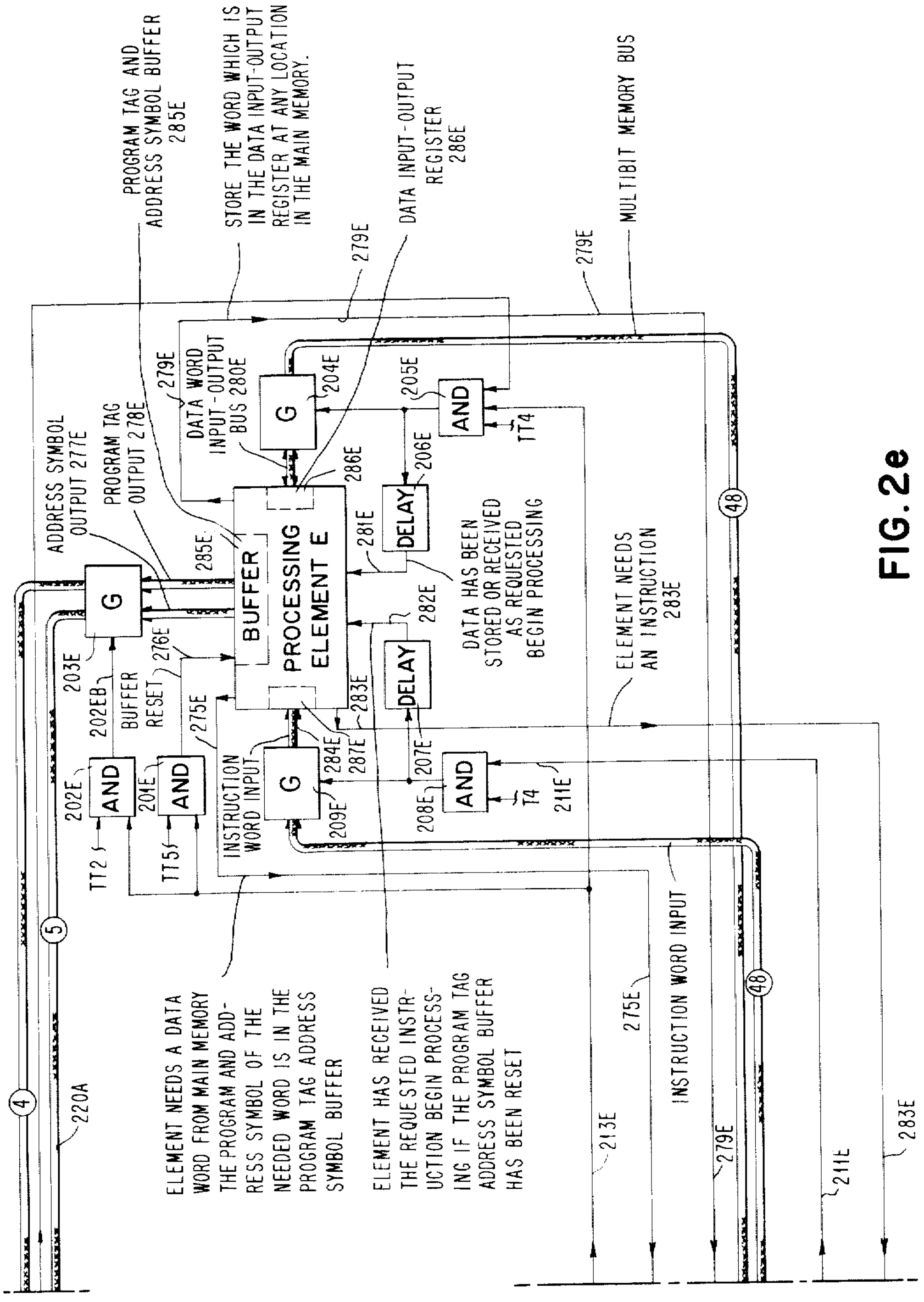
Figure 8:
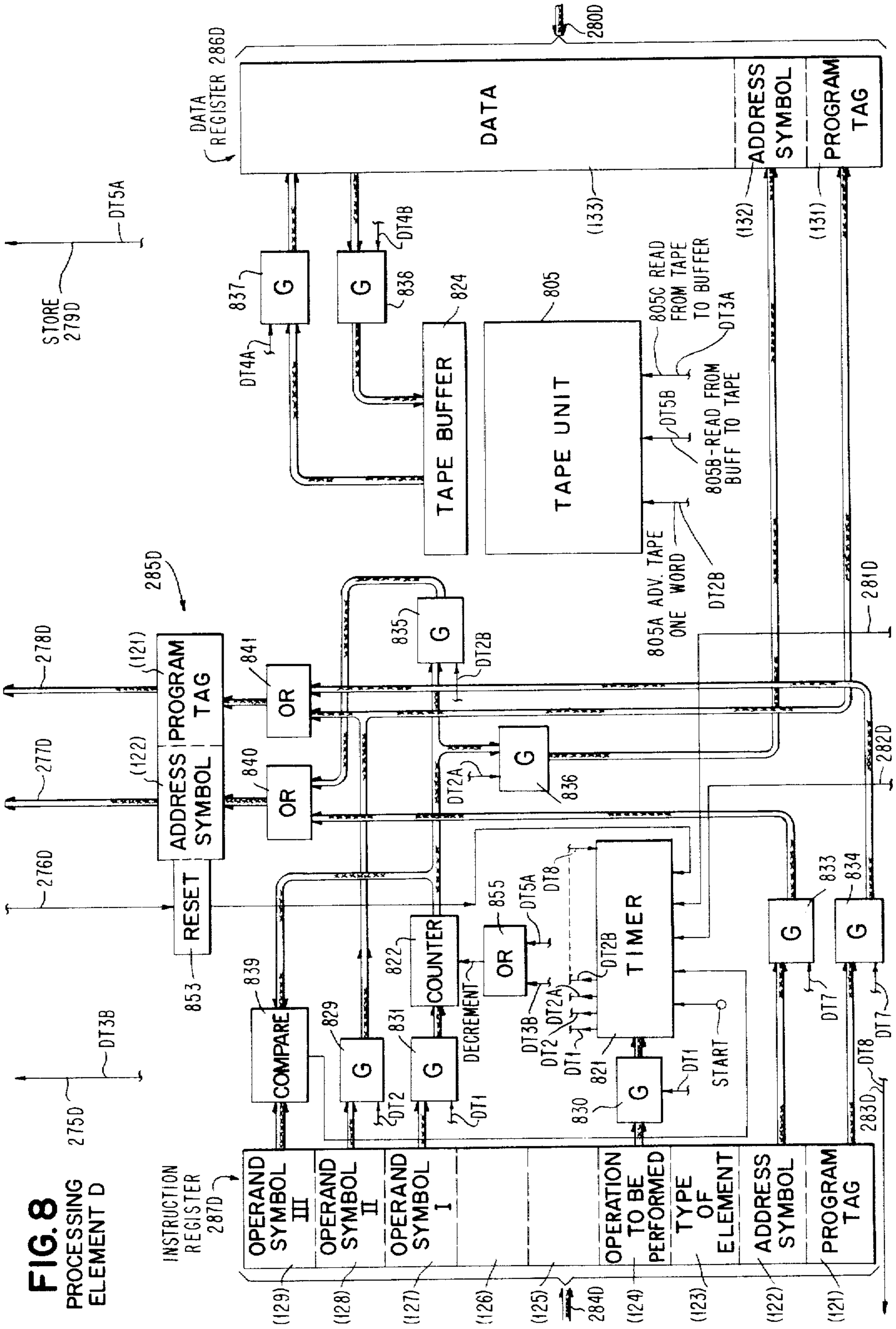

FIGURE 8 is a circuit diagram of processing element D which is shown in FIGURES 1*a* and 2*e*.

Figure 9:
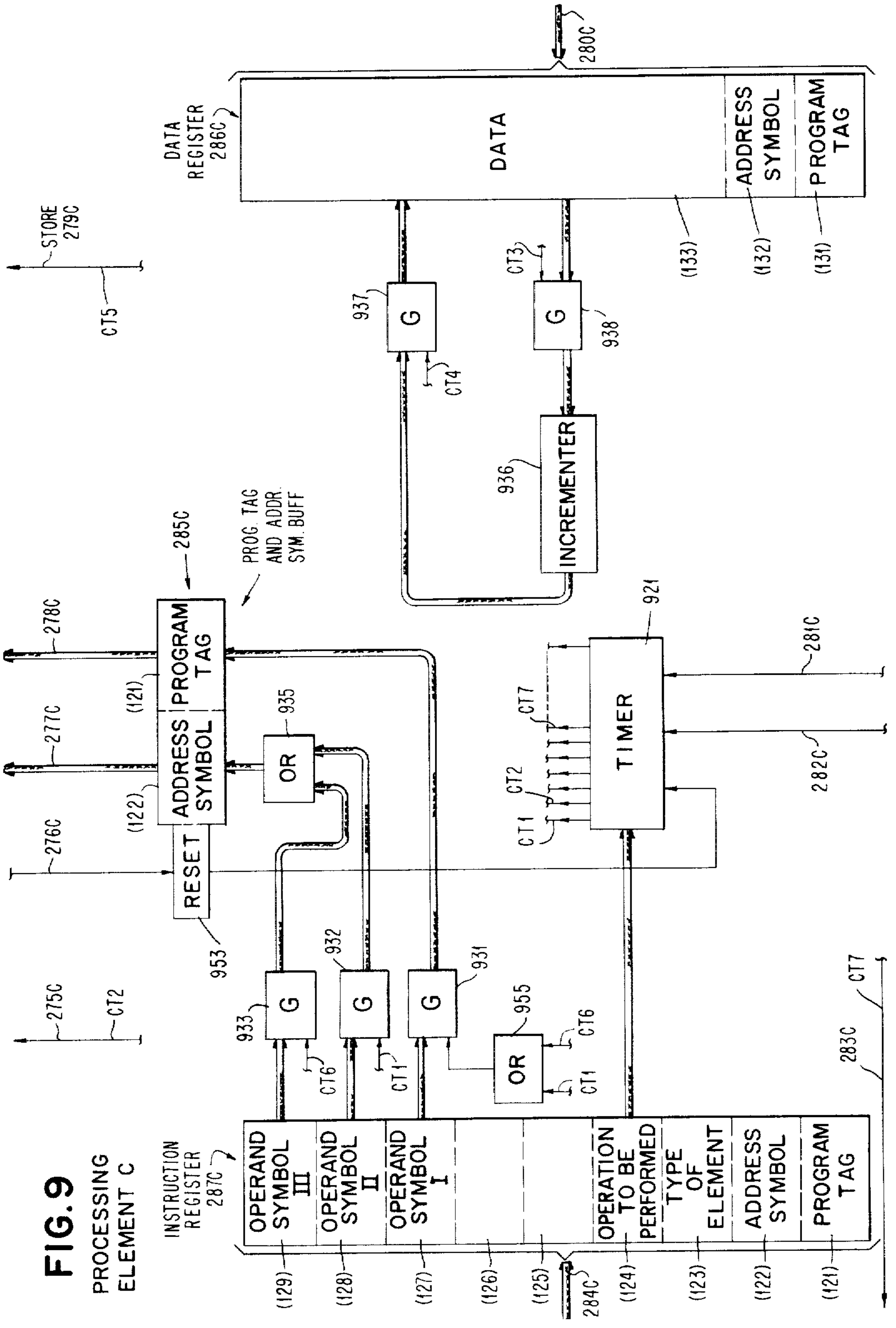

FIGURE 9 is a circuit diagram of processing element C which is shown in FIGURES 1*a* and 2*d*.

Figure 10:
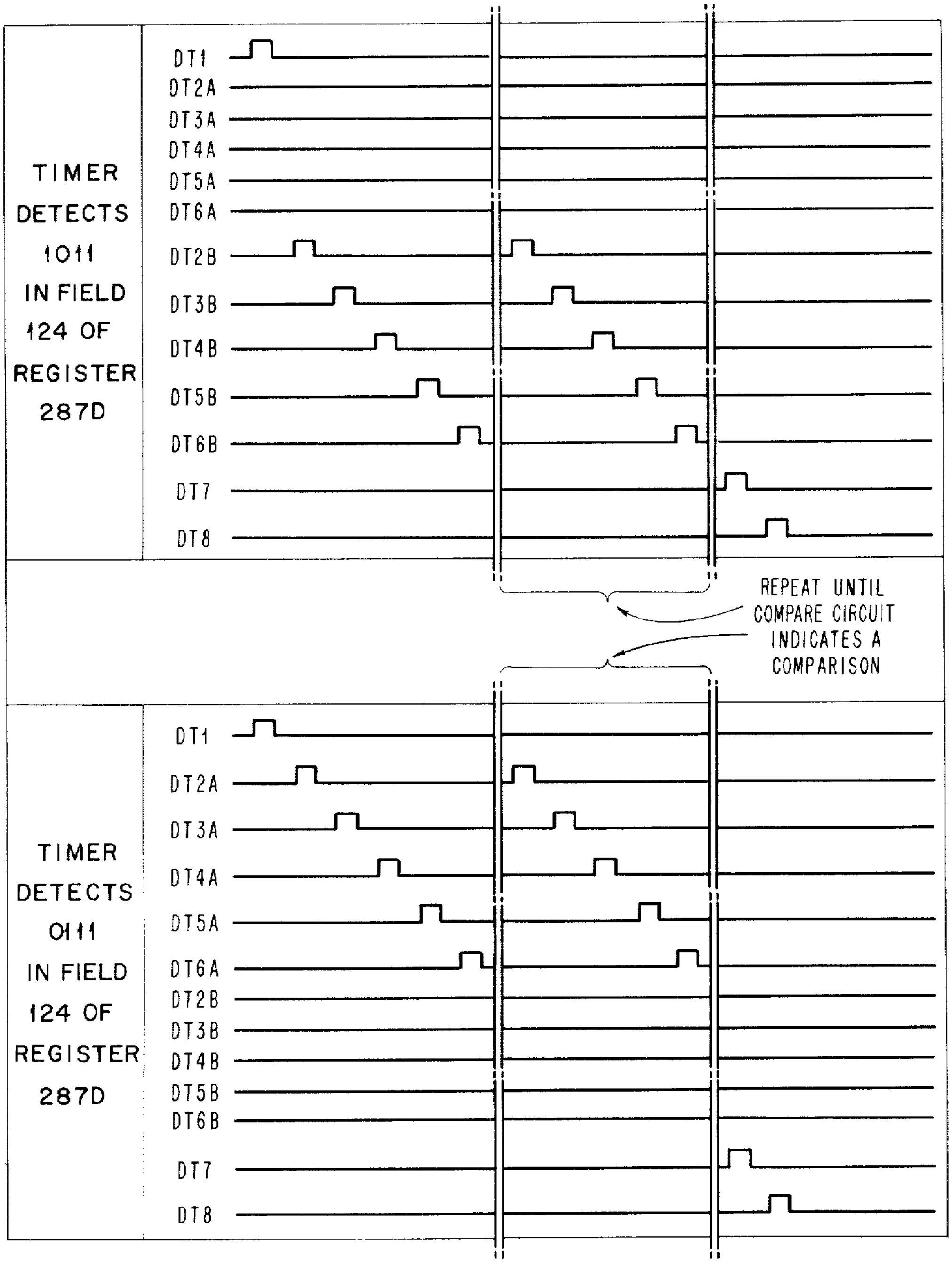

FIGURE 10 is a timing diagram of the output of the timer shown in FIGURE 9.

Figure 11:
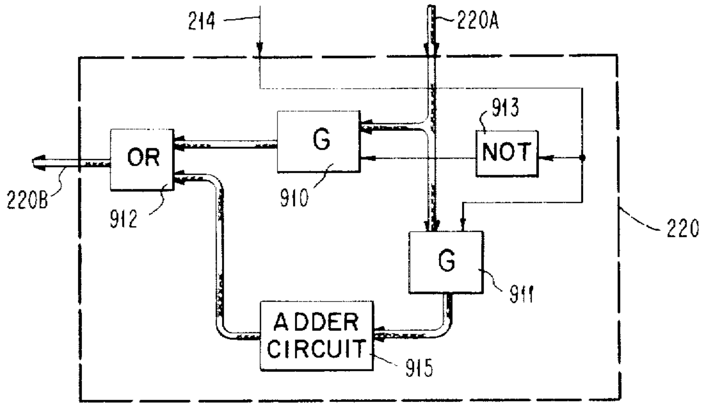

FIGURE 11 is a detailed circuit diagram of add one adder shown in FIGURE 1*a*.

Figure 12A:
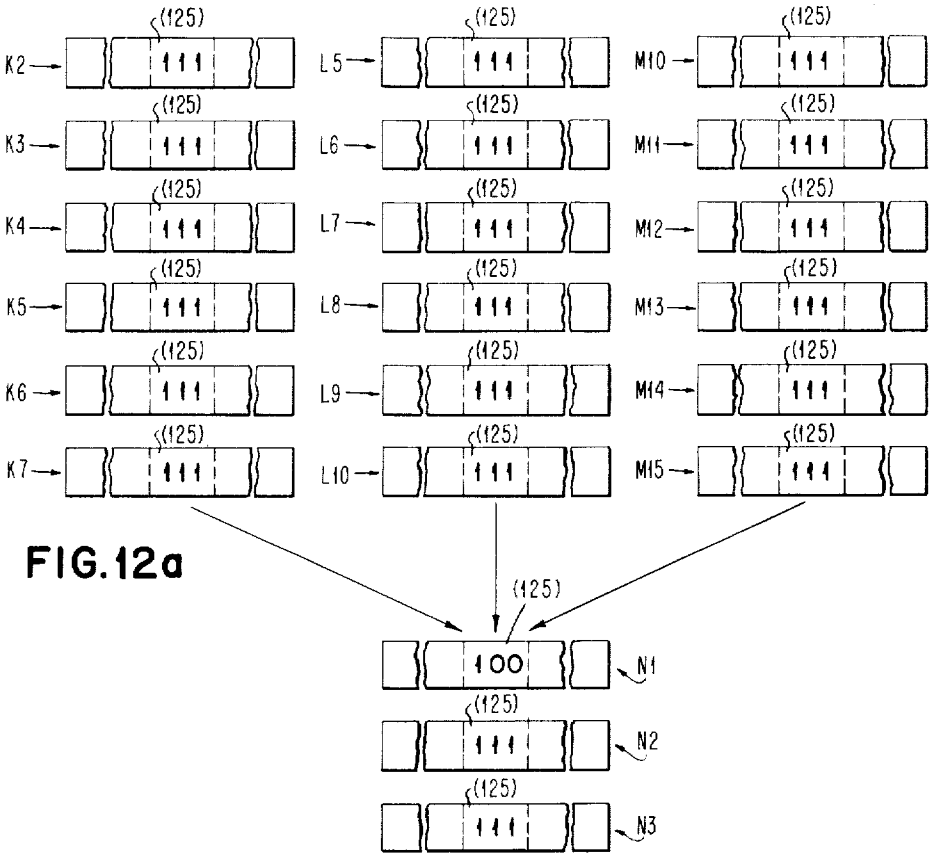

FIGURE 12*a* is a diagram of instructions used to explain sequence combining.

Figure 12B:
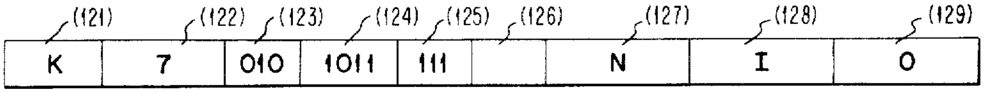

FIGURE 12*b* is a diagram of an end of sequence instruction.

*General description of major components of the system*

A general overall flow diagram of the system is shown in FIGURE 1*a*. The system consists of a main memory 112, an instruction ready memory 113 and five processing elements A, B, C, D and E.

Each of the processing elements A to E is an autonomous (or independent) computing element. Each of the processing elements A to E receives instruction from instruction ready memory 113; however, after a particular processing element receives an instruction it proceeds to execute this instruction while operating independently from the rest of the system. After a processing element completes the execution of an instruction, it signals the system that it has finished executing the instruction and that it is ready to receive another instruction. The type of operation which each of the processing elements A to E is capable of performing is tabulated in the chart of FIGURE 1*b*.

Each of the memories 112 and 113 is an associative or content addressed memory. That is, a word is addressed and read out of a memory location, not by specifying the address of the particular memory location where the word is stored, but instead by specifying the information contained in one or more particular fields in the word. Memory 113 also has the further capabilities as specified below. When one specifies the content of a particular field (hereinafter called the type of element field) of the instruction word which one desires to readout, and there are two or more instruction words in the memory 113 which have the specified information in the specified field, memory 113 has the ability to examine another field in these instruction words (called a priority field) to determine which one of the instruction words has the highest priority. If more than one of these instruction words has the same priority memory 113 has the still further ability to readout the particular one of these instruction words which has been stored in memory 113 for the longest period of time. The details of memories 112 and 113 will be explained later.

Figure 1C:
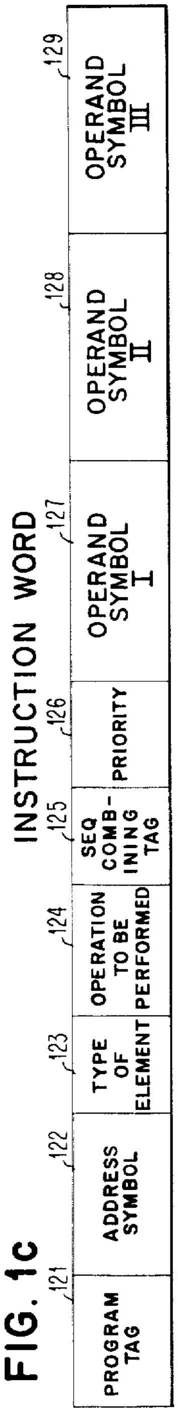

In the particular embodiment of the invention shown herein, each instruction word has nine fields 121 to 129 as shown in FIGURE 1*c*. The information stored in field 121 of each instruction word is termed the program tag and it specifies the particular program (or instruction sequence) with which the particular instruction word is associated. The information stored in field 122 of each instruction word is termed the address symbol and it specifies the location of the particular instruction in the program specified by the program tag in field 121 of the particular instruction. The information stored in field 123 of each instruction word indicates the type of element needed to perform the particular instruction and the information in field 124 of each instruction word indicates the particular operation which is to be performed. The information stored in field 125 of certain instruction words is termed the sequence combining tag, the function of the sequence combining tag will be explained later.

Depending upon its importance, each program has a priority rating assigned thereto, the more important programs being given higher priority. The information in field 126 specifies the priority of the particular program with which the particular instruction is associated.

The information stored in fields 127, 128 and 129 are operand symbols which either specify operands upon which the particular instruction is to operate, or which specify the identification in memory of the operands upon which the particular instruction is to operate. Naturally, as in other computing systems, the operand fields may also contain information required in order to execute a transfer or decision instruction. Herein each instruction word is shown as containing three operand symbols in fields 127, 128 and 129. Three fields are shown merely for the purpose of illustration and naturally, in accordance with techniques known in the art, more or less operand fields could be used in various known ways. The main memory 112 also has stored therein data words which are associated with the various programs.

Figure 1D:
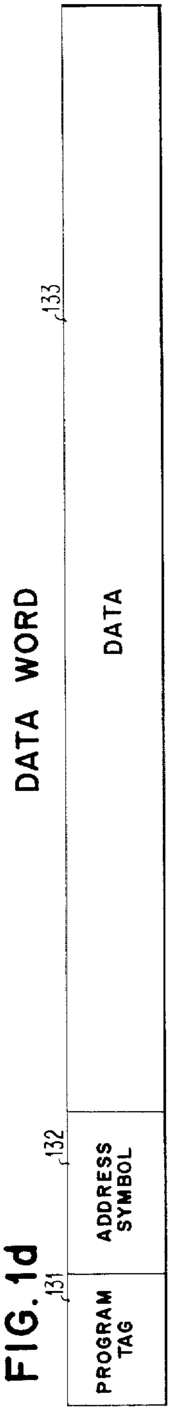

Each of the data words stored in main memory 112 has the format shown in FIGURE 1*d* which includes the three fields 131, 132 and 133. The data per se is stored in field 133. The information in field 131 specifies the particular program with which the data stored in field 133 is associated. The information which is stored in field 132 of any data word specifies a particular data word out of all the data words which are associated with the program whose identification is specified in field 131.

The general capability of each of the processing elements A, B, C, D and E is specified in the second column of FIGURE 1*b* and the particular binary number (in field 123 of an instruction word) which specifies each type of processing element is listed in the third column of FIGURE 1*b*. As indicated by the chart of FIGURE 1*b*, both processing element A and processing element B are capable of performing addition and multiplication and the binary number 110 in field 123 of an instruction indicates that it must be performed by the type of a processing element which is capable of addition and multiplication (i.e., the instruction must be performed by either processing element A or processing element B). However, the instruction words do not specify which particular processing element must execute the particular instruction. Depending upon the frequency of use, more or less of a particular type of processing element can be added into the system. Herein the particular processing elements which are shown (two of which are type 110) are merely meant to be illustrative for the purpose of explaining the invention and it should be understood that various other types of processing elements can be added into the system.

*General description of an example of the operation of the system*

For present purposes of illustration, the system will be assumed to be operating upon four independent programs which are stored in memory 112. Each of the four programs stored in memory 112 consist of one ordered sequence of instructions. Each instruction has a format shown in FIGURE 1*c*. At any particular time, there is one instruction in each sequence of instructions (i.e. in each program) which is ready for execution. Whenever an instruction becomes ready for execution, it is transferred (in a manner which will be explained in detail later) from main memory 112 into the instruction ready memory 113.

Figure 1E:
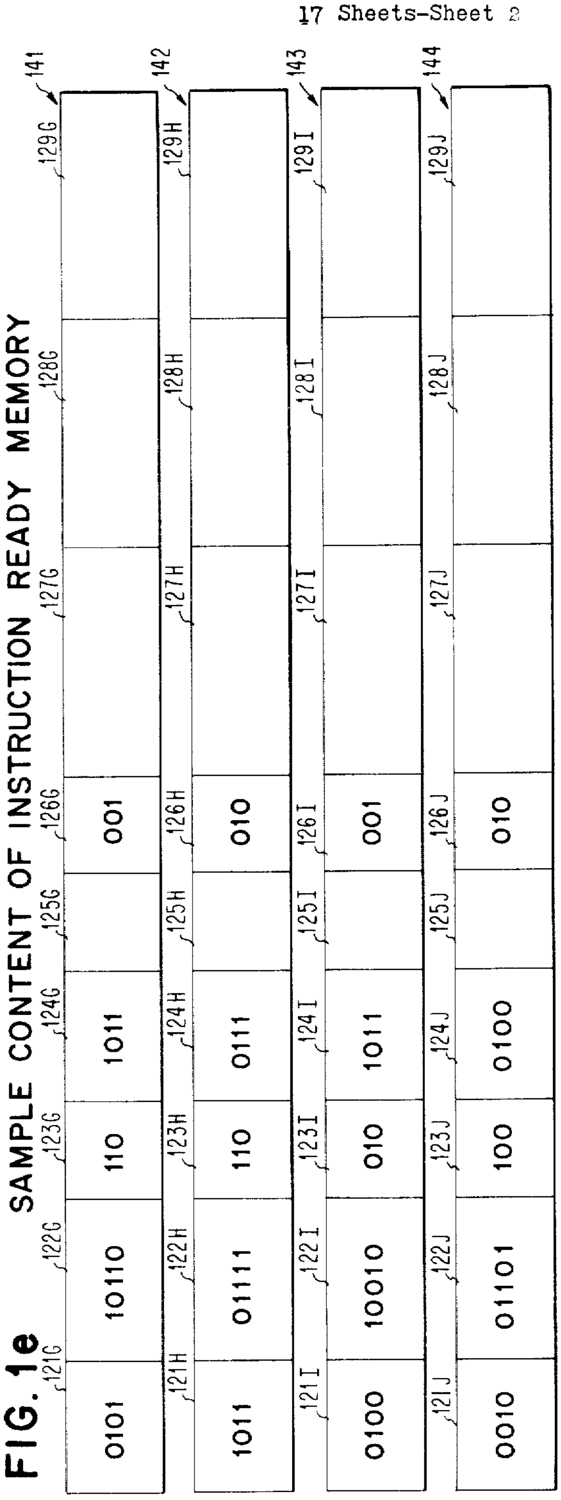

Since the system is operating upon four independent programs (each of which for the present discussion is assumed to have only one sequence of instructions), there will be at any particular time only four instructions in the instruction ready memory 113. For purposes of illustration, four particular instruction words 141 to 144 which may be in instruction ready memory 113 at one particular time are shown in FIGURE 1*e*. Naturally, the size of each of the fields in the instruction words is here chosen merely for the purpose of illustration and these fields may be any size which is needed in the particular application of the invention.

For convenience in reference between the specification and the drawings, each of the fields of the words 141 to 144 is identified by a numeral followed by a letter. The numeral which identifies each field is the same as the numeral wihch identifies the same type of field in FIGURE 1*c*. Each set of numerals which identifies a field in instruction word 141 is followed by the letter G, each set of numerals which identifies a field in instruction word 142 is followed by the letter H, each set of numerals which identifies a field in instruction word 143 is followed by letter I, and each set of numerals which identifies a field in the instruction word 144 is followed by the letter J.

The information in fields 121G to 121J identifies the four programs with which the four particular data words are associated, and the information in fields 122G to 122J identifies the particular position which each instruction occupies in its associated program.

The information in fields 123G to 123J identifies the type of element which is capable of executing the respective instructions. It should be noted that both instruction 141 and instruction 142 can be executed by the same type of element identified by the binary number 110 in fields 123G and 123H. Instructions 143 and 144 must be executed by other types of elements as indicated by the binary numbers in fields 123I and 123J.

As previously stated, whenever a processing element becomes idle it requests an instruction from instruction ready memory 113. When the system receives such a request, the system interrogates memory 113 to find if there is an instruction therein which has in field 123 the symbol which indicates that the particular instruction can be performed by the element which is requesting the instruction. In the present case, when processing element B indicates that it needs an instruction, the system interrogates instruction ready memory 113 to find if any of the instruction words therein has the symbol 110 in field 123. In the example presently being discussed, the four instructions shown in FIGURE 1*e* are in the memory and hence the system finds that both instructions 141 and 142 have the symbol 110 in field 123. Since two instructions are found which are capable of being executed by element B, the system interrogates fields 126 of these two instructions to determine which has the highest priority. In the present case, the number stored in the field 126H is greater than the number stored in field 126G and hence the memory reads out instruction 142 and passes it to processing element B. If both instructions 141 and 142 had the same number stored in their priority fields, the system would readout the particular instruction which had been stored in instruction ready memory 113 for the longest period of time (the details of memory 113 are given later).

After a processing element receives an instruction, it operates independently of the remainder of the system. First it interrogates field 124 of the instruction which it has received to determine the operation which it is to perform. It then requests from main memory 112 any data which is required and after it has received the required data, it performs the desired operation. After the operation has been performed, the processing element stores the result in the main memory 112 (if the instruction which it receives indicates that this is what is to be done). Once the complete operation has been performed (and if required the result has been stored in main memory 112) the processing element signals the system that it has completed the instruction which it received.

When the system receives an indication that a processing element has completed an instruction, it interrogates the processing element to determine the particular program and the particular instruction upon which the processing element has been working. After the system has determined this information, it interrogates the main memory 112 and brings the next instruction in the same program into the instruction ready memory 113. Simultaneously (subject to certain limitations discussed later) with the above operation, the system interrogates the instruction ready memory 113 to determine if there is another instruction in the instruction ready memory which the processing element can perform. Thereafter, the general cycle described above is repeated.

Practically an unlimited queuing facility can be obtained through the use of priority field 125 and furthermore a program such as a diagnostic program can be assigned the highest priority thereby insuring that it will be executed by the system in preference to all other programs in the system.

*Functional description of major components of the system*

We will now give a more detailed explanation of the system with reference to detailed circuit diagram shown in FIGURES 2*a*, 2*b*, 2*c*, 2*d* and 2*e*. FIGURES 2*a*, 2*b*, 2*c*, 2*d* and 2*e* which fit together as shown in FIGURE 2, shows in the interconnections between the major components.

It should be noted that two different types of interconnections between the various components are shown in the circuit diagrams of FIGURES 2*a*, 2*b*, 2*c*, 2*d* and 2*e*. Single line connections which merely transmit one signal between components are represented by single lines and cables which simultaneously transmit a plurality of signals between components are designated by dual lines which enclose cross-hatching. The number of wires in each cable is shown in an enlarged portion of each cable.

As shown in FIGURE 2*a*, the main memory 112 consists of four major components; the interrogation register 401, the main associative memory 402 which has a plurality of storage registers, the input-output buffer register 403, and the main memory access control 404. The bit positions in each register in the memory 402 and the bit positions in registers 401 and buffer 403 can be considered as being divided into the field specified in FIGURES 1*c* and 1*d*. The main memory 112 operates as follows: Information is placed in fields 121 and 122 of interrogation register 401 and thereafter line 404A (TT3) of access control 404 is activated. The memory 112 then searches the storage registers in the main associative memory 402 to determine if any word stored in the main associative memory 402 has the same information in its fields 121 and 122 as the information which is in fields 121 and 122 of the interrogation register 401. If there is such a word in the main associative memory 402, the entire word is read into the memory buffer register 403.

Words may be stored in the main associative memory 402 by placing the word in memory buffer register 403 and by then activating line 223 which activates access control 404. Activation of lines 223 causes the word in memory buffer register 403 to be stored in any empty position in the main associative memory 402. The location in the memory where the word is to be stored may not be specified; however, the location where the word is stored is not important since a word is addressed not by specifying its location in memory but instead a word is addressed by specifying the content of a particular field (or fields). The circuit details of the main memory 112 are not shown herein since any of the associative memories known in the prior art can be used.

Examples of specific circuitry which could be used to embody memory 112 is shown in copending patent application Serial No. 858,793, entitled "Memory System," filed December 10, 1959 by J. L. Anderson, now abandoned, in copending patent application Serial No. 119,719, entitled "Associative Memory," filed June 26, 1961, by R. I. Roth, and in copending patent application Serial No. 836,751, entitled "Memory System" by R. R. Seeber and A. J. Scriner, now Patent No. 3,160,856, dated December 8, 1964, all of which are assigned to the assignee of the present application. Another example is shown in an article entitled "A Magnetic Associative Memory" by J. R. Kiseda et al. which appeared in the IBM Journal of Research and Development, vol. 5, April 1961, p. 106. Other memory systems which are capable of associative or content addressing could also be used.

As shown in FIGURE 2*b*, the instruction ready memory 113 consists of the instruction ready associative memory 302 which has a plurality of storage registers, interrogation register 301, and instruction ready memory access control 304. A buffer register 303 is also associated with memory 113. Each storage register in memory 302, the interrogation register 301 and buffer register 303 are divided into the fields specified in FIGURE 1*c*. The instruction ready memory 113 is operated by placing information in field 123 of interrogation register 301 and then activating line 304A (T3). The memory 113 then determines whether there is any word stored in the associative memory 302 which has the same information in its field 124 as the information in field 124 of interrogation register 301. If one such word is found, it is read out of the memory into buffer 303.

The operation of the memory, if more than one word is found with the desired information in field 123, is as follows: The memory searches priority fields 126 of each of the instructions which has the desired symbol in field 123 to determine which of these instruction words has the highest priority symbol in field 126. If this search still results in two instructions, the one instruction which has been in the memory for the longest period of time is read out. Instruction words can be stored in memory 302 via cable 113A.

The details of the instruction ready memory 113 are not shown herein since such a memory is explained in detail in a copending application Serial No. 176,958, filed March 2, 1962, entitled Random Memory With Ordered Read Out, by R. I. Roth and assigned to the assignee of the present application.

The multiposition gates (designated in the drawings by a G), AND circuits and delay lines which control the flow of signals and information into and out of each of the five processing elements A to E are identical for each processing element. In order to facilitate reference between the drawings and the specification, each of the components shown in FIGURES 2*c*, 2*d* and 2*e* which is duplicated for each of the processing elements A to E is designated by a three digit numeral which has a two in the hudreds digit. The number is followed by a letter. The three digit numeral is common to all of the similar components and the letter which follows each numeral designates the particular processing element with which the component is associated. For example, there are five identical AND circuits 201A, 201B, 201C, 201D and 201E which are respectively associated with the processing elements A, B, C, D and E. There are nine components associated with each processing element and respectively designated 201 to 209 followed by the appropriate letter which controls the flow of information and of signals into and out of each of the processing elements A to E.

Each processing element irrespective of its capabilities has ten inputs and outputs designated 275 to 284 followed by the appropriate letter and three registers designated 285 to 287 followed by the appropriate letter. Each of the inputs, outputs and registers for each of the processing elements A to E shown in FIGURES 2*c*, 2*d* and 2*e* is identified by the same numeral; however, the numeral which identifies the inputs, outputs and registers of the various processing elements A to E is followed by the letter which designates the particular processing element. For example, the inputs and outputs of processing element A (FIGURE 2*c*) are labeled 275A to 284A.

Next, the manner in which each of the processing elements A to E shown in FIGURES 2*c*, 2*d* and 2*e* operates with respect to the rest of the system will be described. The present explanation will merely deal with the external operation of the processing elements, that is, with the signals which each of the processing elements supplies and receives from the rest of the system. The discussion is equally applicable to any one of the processing elements; hence, the input, output, gates, etc. will merely be described by a three digit numeral. By adding the appropriate letter after the numeral, the discussion can be made applicable to any particular one of the processing elements. The discussion is most easily followed by looking at FIGURE 2*e*, since the inputs and outputs of processing element E shown in FIGURE 2*e* are completely labeled.

When a processing element is not executing an instruction, it indicates its idle status by activating line 283 (note as explained above, the number 283 may refer to any one of the lines 283A to 283E). The system interprets a signal on line 283 as an indication that the processing element needs an instruction. When the system finds an instruction which the particular processing elements can execute, it supplies this instruction to the processing element instruction register 287 via cable 284 and after the instruction has been placed in register 287, the system activates line 282 which tells the element that it has received the requested instruction and that it may begin processing this instruction if its program tag and address symbol buffer 285 has been reset. The reason for the requirement that 285 be reset will be seen later.

Once line 282 has been activated and the processing element has begun processing the instruction which is in register 287, the element may find that it needs certain data. If this is the case, the element will insert in buffer 285 the program tag and address symbol for the required data, and it will activate line 275 which tells the system that the element needs a data word from main memory. It should be noted that the program tag for the data word required by the element is usually the same program tag as is in field 121 of the instruction word which the element is executing and the address symbol of the required data word is in some way included in one of the operand fields of the instruction word (n.b. the instruction word is in buffer 287). When the system has obtained the required information from the main memory it places this information in data register 286 of the processing element via memory bus 280 and after the information has been supplied to the element the system activates line 281 which tells the element that the requested data is in register 286 and that the element may begin processing this data.

If during the execution of an instruction, a processing element determines that it must store a particular data word in the main memory it places this data word in the data register 286 and it thereafter activates the output line 279. Activation of line 279 tells the system that the data word stored in data register 286 should be stored in the main memory. It should be noted that when a word is stored in an associative memory, it is irrelevant in which particular position in the memory the word is stored since when one attempts to retrieve a word from an associative memory one does not specify the location of the memory, but instead one specifies the content of fields 131 and 132 in order to retrieve a data word. The element must place the content fields 131 and 132 in data register 286 before it attempts to store a word in the memory. The program tag for the data word which is to be stored will usually be the same as the program tag for the instruction word which is being executed (i.e. the program tag in register 287) and the address symbol must either be in one of the operand fields of the instruction or it must be generated by the element. When the system has stored in the memory a data word which was placed in data register 286 it activates line 281 which tells the processing element that the data word has been stored in the memory as required.

After a processing element has completely executed an instruction, it places the program tag and the address symbol of the instruction which it has executed in buffer 285 (i.e. it takes the content of fields 121 and 122 from instruction register 287 and it places this information in buffer 285). After the program tag and address symbol has been placed in buffer 285, the element activates line 283. When line 283 is activated, the system knows that the element has completed processing an instruction and that the next instruction in the same program as the instruction which the element has completed is now ready for execution. The system takes the program tag and the address symbol from buffer 285, it increments the address symbol by "one" and it takes the instruction thereby identified from the main memory 112 into the instruction ready memory 113. After the next instruction in the program has been taken from the main memory 112 to the instruction ready memory 113 the system activates buffer reset line 276 to reset the buffer 295 to zero.

The processing element may receive a second instruction before the system has reset the buffer 285. However, the element cannot begin processing a second instruction until buffer 285 has been reset. The reason for this limitation will become evident later when the interaction between memory 112 and 113 is explained. Generally, it may be stated that the above limitation is placed upon the elements in order to keep the two memories operating as much of the time as is possible and in order to give the system the ability to combine two sequences of instructions into one sequence of instruction. The above will be explained in detail later.

Figure 3:
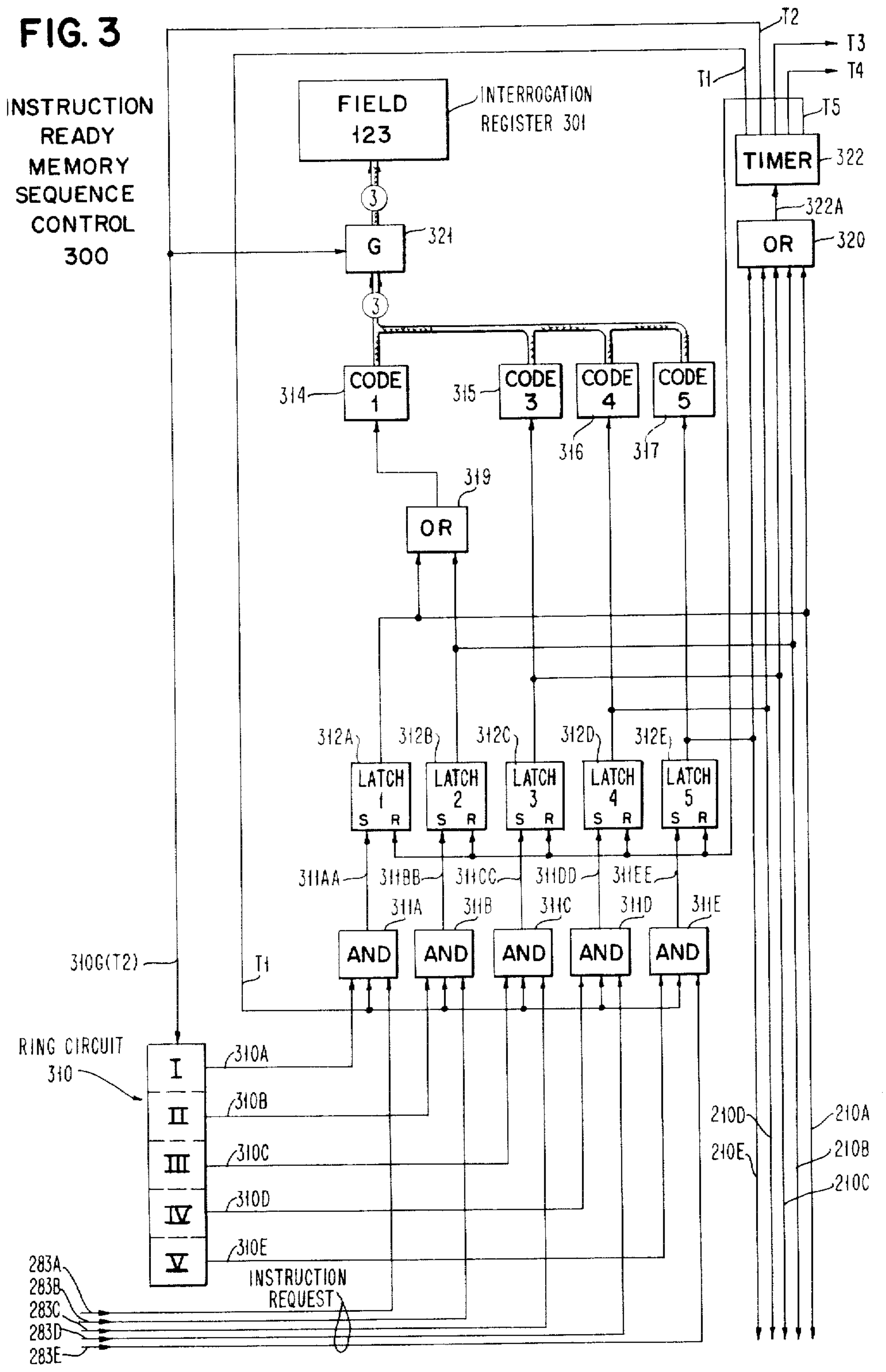
Figures 4, 4A:
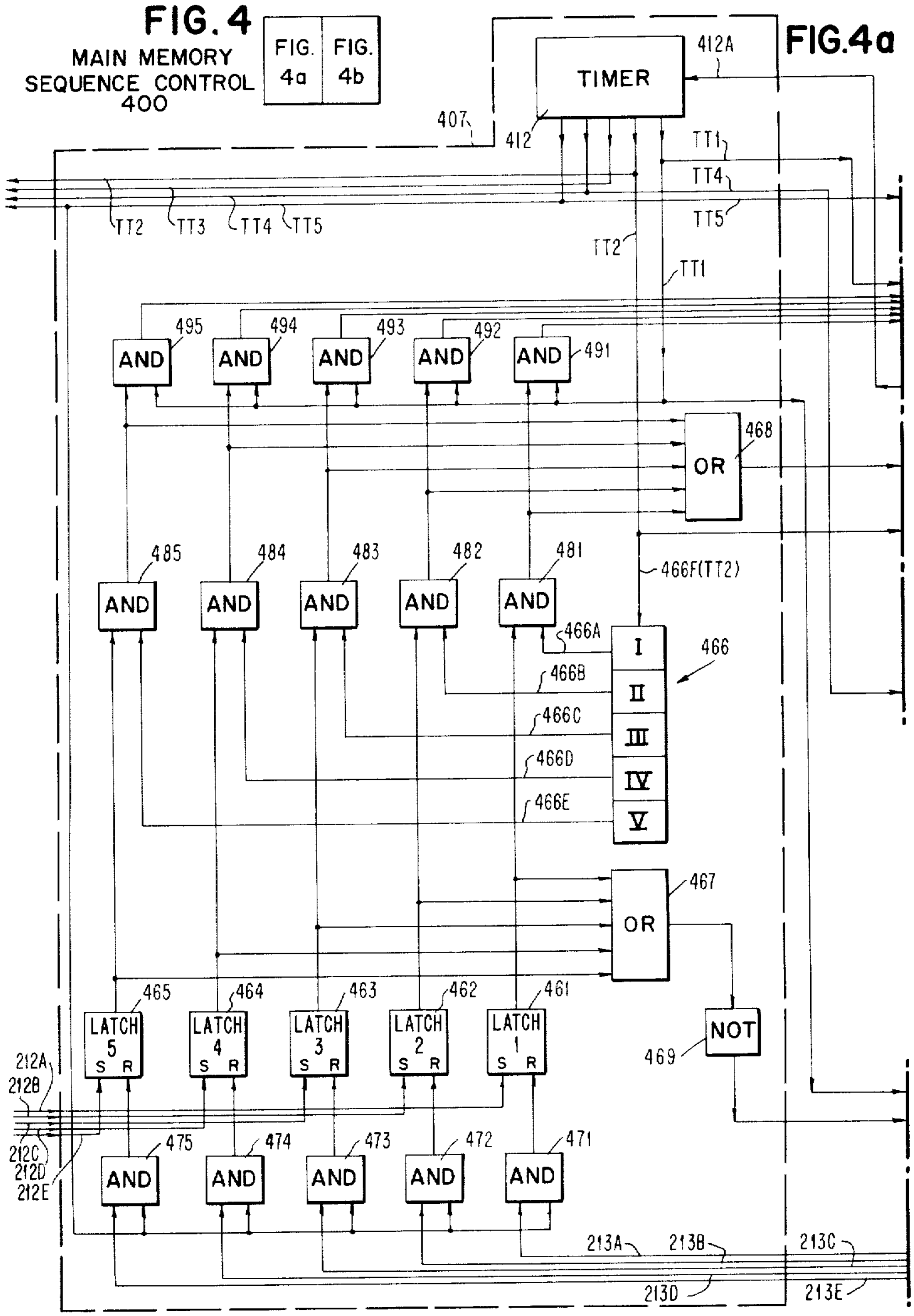

The general functions which the instruction ready memory sequence control 300 (FIGURE 2*b*) and the main memory sequence control 400 (FIGURE 2*a*) performs will now be explained. An explanation of the details of the circuit of the instruction ready sequence control 300 and the main memory control 400 which are shown in FIGURES 3 and 4 will be postponed until later.

The instruction ready memory sequence control 300 (FIGURE 2*b*) determines which particular processing element will interrogate the instruction ready memory 113 at any particular time. The instruction ready memory sequence control 300 has five inputs (i.e., the five in instruction request lines 283A to 283E from elements A to E) and it has five outputs (i.e., processing element selection lines 210A to 210E which are respectively associated with processing elements A to E) plus a connection to register 301. If two of the lines 283A to 283E are active at any one time (i.e., if two processing elements simultaneously request an instruction) the instruction ready memory sequence control 300 determines which particular processing element will first interrogate the instruction ready memory 113.

The instruction ready memory sequence control 300 includes a five place timer which sequentially goes through five positions. For present purposes, it is merely necessary to indicate that the fourth position of this timer is only reached after an instruction has been read out of the instruction ready associative memory 302 into buffer 303.

The five outputs of the timer which are respectively activated by the five states of the timer are designated T1, T2, T3, T4 and T5. The designation of certain lines which are activated by one of the lines T1 to T5 is followed by the designation of the corresponding line T1 to T5 in parentheses. For example, one input to access control 304 is designated 304A (T3). Timer output T4 activates one of the inputs to each of the AND circuits 208A through 208E (FIGURES 2*c* to 2*e*). For convenience in illustration, the connections between timer output T4 and all of the circuits which output T4 activates are not completely shown; however, the connections which are not completely shown are clearly indicated by the designations on the lines. One of the inputs to each of the AND circuits 208A through 208E is clearly labeled T4 indicating a connection to the output T4 shown on FIGURE 2*b*.

After an instruction is read out of the instruction ready memory 302 into buffer 303, instruction ready memory sequence control 300 activates one of the lines 210A to 210E which in turn activates one of the processing element selection lines 211A to 211E to direct the instruction from the buffer 303 to the appropriate processing element. The coincidence of a signal from position T4 of the timer and from one of the processing element selection lines 211A to 211E activates one of the AND circuits 208A to 208E which in turn activates one of the gates 209A to 209E thereby gating the instruction from buffer 303 to one of the processing element instruction registers 287A to 287E.

As previously described, after a processing element has completed performing one particular instruction, the next instruction in the same program (i.e., the instruction with the same program tag and an address symbol higher by one than the instruction which was completed) is transferred from the main memory 112 to the instruction ready memory 113. An adder 220 (FIGURE 2*a*) is provided to generate the address symbol of the instruction which is to be transferred from main memory 112 into instruction ready memory 113. The address symbol of the instruction which was completed is gated to adder 220 via cable 220A and if a signal is present on line 214 (which indicates, as will be explained later, that an instruction transfer operation is being performed) the adder 220 supplies to interrogation register 401 via cable 220B and gate 221 the address symbol of the instruction which is to be transferred from the main memory 112 into the instruction ready memory 113 (i.e. the address symbol received on cable 220A incremented by one. If no signal is present on line 214 (which, as will be explained later, indicates that either a data request or a data store operation is being performed) the data symbol supplied on cable 220A is supplied directly to interrogation register 401 via cable 220B and gate 221 without any change. The details of the add one adder 220 will be explained later with respect to FIGURE 11.

Main memory sequence control 400 has three sets of input lines (1) 212A to 212E, (2) 279A to 279E and (3) 275A to 275E. The activation of one of the lines 212A to 212E by instruction ready memory sequence control 300 (through lines 210A to 210E) indicates that a word is to be transferred from the main memory 112 into the instruction ready memory 113. The particular word which is to be transferred from main memory 112 to instruction ready memory 113 is indicated by the information in the buffer 285 of the particular processing element associated with the one particular line 212A to 212E which is activated.

Activation of one of the lines 279A to 279E indicates that the associated processing element desires to store a word (which is in its data register 287) into the main memory 112 and activation of one of the lines 275A to 275E indicates that the associated processing element desires to read from the main memory 112 the particular data word which is identified by the information in buffer 285 of the particular processing element associated with the activated line. If a plurality of the input lines to main memory sequence control 400 are active at any one time, main memory sequence control 400 determines the order in which the request will be executed. For the present discussion, it merely need be said that main memory sequence control 400 gives priority to instruction transfer requests on input lines 212A to 212E. Stated differently, requests for the transfer of instructions from main memory 112 to the instruction ready memory 113 have priority over requests from the processing elements for data from memory or requests from the processing element to store information in memory.

Main memory sequence control 400 has a set of output lines 213A to 213E one of which is associated with each of the processing elements A to E. Main memory sequence control 400 also has (1) an output line 214 which is activated when an instruction is being transferred from main memory 112 into instruction ready memory 113 (2) an output line 222 which is activated in order to transfer information from the program tag and address symbol buffer 285 of one of the processing elements into the interrogation register 401 and (3) an output line 233 which is activated in order to initiate the transfer of information from main memory buffer register 403 into the main associative memory 402.

Main memory sequence control 400 includes a timer which will be explained in detail later. For present purposes, it is sufficient to say that the timer in main memory sequence control 400 goes through five states during each cycle of operation. The five outputs of the timer (which are respectively activated during the five states of the timer) are designated TT1, TT2, TT3, TT4 and TT5. The designation of certain lines which are activated by one of the lines TT1 to TT5 is followed by the designation of the corresponding line TT1 to TT5 in parentheses. For example, one input to access control 404 is designated 404A (TT3). For convenience in illustration, the connections between the timer outputs TT2, TT4 and TT5 and all of the circuits which they activate are not completely shown; however, the connections are clearly indicated by the designations on the lines. For example, the output TT2 activates one input to each of the AND circuits 202A to 202E, hence, output TT2 is connected to the five lines on FIGURE 2*a* and one of the inputs to each of the AND circuits 202A to 202E (FIGURES 2*c* to 2*e*) is labelled TT2. However, for convenience in illustration, the connection between the five lines connected to output TT2 on FIGURE 2*a* and the inputs to circuits 202A to 202E on FIGURES 2*a* to 2*e* is not shown.

Irrespective of whether the operation being performed is an operation where data is stored in main memory, an operation where data is read out of main memory, or an operation where an instruction is transferred from main memory 112 into memory 113, main memory sequence control 400 activates one of the lines 213A to 213E which indicates the one particular processing element which is being given access to the main memory 112 at that particular time.

If an instruction transfer operation is being performed, main memory sequence control 400 activates line 214 in addition to one of the lines 213A to 213E. Activation of line 214 through the operation of inverter (NOT circuit) 215 and AND circuits 205A to 205E prevents the gates 204A to 204E from opening and it also conditions adder circuit 220 such that the address symbol which is transferred from one of the buffers 285 to interrogation register 401 has one added to it. In this manner, the instruction transferred from the main memory 112 to the instruction ready memory 113 is the next instruction which is in the same program as the instruction, the execution of which was completed by the element which initiated the instruction transfer operation. Activation of line 214 also conditions AND circuit 226 and gate 225 at time TT4 such that information can be transferred from the main memory buffer register 403 into the instruction ready memory 113. AND circuit 226 also has an input which is connected to the output of NOT circuit 228. NOT circuit 228 is activated by position T3 of the timer in instruction ready memory sequence control 300. Since position T3 of this same timer initiates readout operations from instruction ready memory 113, NOT circuit 228, AND circuit 226 and gate 225 prevent information from being read into memory 113 while information is being read out of the same memory. AND circuit 226 also has another input which is connected to the output of the line 227A of detector 227. The function of this input and the function of detector 227 will be explained later in the section of the specification entitled "Combining Instruction Sequences."

Main memory sequence control 400 also activates line 222 which activates gate 221 therefore transferring information from one of the buffer registers 285 (i.e. from the buffer register 285 in the particular processing element indicated by the activation of one of the lines 213A to 213E) through gate 221 to the interrogation register 401 of the main memory 113.

*Combining instruction sequence*

During certain operations, it is necessary, or at least desirable, to fan-in or combine two or more separate sequences of instructions into one sequence of instructions (see FIGURE 12*a*). The first instruction in the new sequence of instructions cannot be executed until the last instruction in each of the other sequences of instructions is completed. Stated differently, when a single sequence of instructions is being executed, each instruction can be executed immediately after the one preceding instruction in the same sequence of instructions is executed; however, when two or more sequences of instructions are being combined into a single sequence of instructions, the first instruction in the single sequence of instructions cannot be executed until the last instruction in each of the separate sequences has been executed.

Combining instruction sequences is illustrated in FIGURE 12*a* which shows four sequences of instructions; K, L, M and N. The K sequence of instructions consists of instructions K2 to K7, the L sequence of instructions consists of instructions L5 to L10, the M sequence of instructions consists of instructions M10 to M15 and the N sequence of instructions consists of instructions N1 to N3. Instruction N1 cannot be executed before instructions K7, L10 and M15 have been executed. Instructions which cannot be executed before a plurality of instructions which are in different sequences are executed, are herein called "multisequence dependent instructions" and the last instruction in each sequence (i.e. the instruction which must be executed before a multisequence dependent instruction can be executed) are herein called the "end of sequence" instructions. Hence, instruction N1 is a multisequence dependent instruction and instructions K7, L10 and M15 are end of sequence instructions.

The four instruction sequences K, L, M and N shown in FIGURE 12*a* may be termed interdependent instruction sequences since the execution of the four sequences is interrelated. However, while the system is executing instruction sequences K, L and M and before the system arrives at any one of the end of sequence instructions K7, L10 and M10, the system handles instruction sequences K, L and M as independent instruction sequences. Likewise, after the system begins executing instruction sequence N, instruction sequence N is operated upon by the system as an independent instruction sequence. In order to avoid confusion between the terms "interdependent instruction sequence" and "independent instruction sequence" and since during the major part of the time that interdependent instruction sequences are being operated upon by the system, they are handled as independent instruction sequences, all instruction sequences are herein generally termed independent instruction sequences and situations such as that illustrated in FIGURE 12*a* are described as situations where independent instruction sequences are fanned-in or are combined.

Instructions which can be executed immediately after one preceding instruction in the same sequence of instructions is executed have the symbol 111 in field 125. Multisequence dependent instructions do not initially have the symbol 111 in field 125. The symbol which such instructions do have in field 125 and how the information which is in field 125 of such instructions is used will be explained later after the manner in which instructions have the symbol 111 in field 125 are transmitted from main memory 112 to instruction ready memory 113 is explained.

The system of the present invention includes a detector 227 (shown in FIGURE 2*a*) which examines the symbol which is in field 125 of each instruction which is read out of the main memory 112. If an instruction has the symbol 111 in field 125, detector 227 activates line 227A and if an instruction does not have the symbol 111 in its field 125, the detector 227 does not activate line 227A.

Line 227A is connected to one of the inputs of AND circuit 226 and hence if line 227A is not activated, the output of AND circuit 226 cannot be activated and hence gate 225 cannot be conditioned to pass an instruction from main memory 112 to instruction ready memory 113. Therefore, the only instructions which are transferred from main memory 112 to instruction ready memory 113 are instructions which have the symbol 111 in field 125.

When multisequence dependent instructions are placed in the main memory 112, they do not have the symbol 111 in their field 125. The symbol which is placed in field 125 of such instructions depends upon the number of end of sequence instructions which must be executed before the particular multisequence dependent instruction can be executed. The symbol placed in field 125 of multisequence dependent instruction is the binary number which is obtained by taking the binary number 111 and decreasing it by a binary one for each end of sequence instruction which must be executed before the particular instruction can be executed. For example, if three end of sequence instructions must be executed before a certain multisequence dependent instruction can be executed, the symbol in field 125 of the particular multisequence dependent instruction is the binary number 111 decreased by three or the binary number 100, likewise, if four end of sequence instructions must be executed, before a particular multisequence dependent instruction can be executed, the symbol in field 125 of the particular multisequence dependent instruction is the binary number which is equal to binary number 111 decreased by four or the binary number 011, etc. Since three end of sequence instructions K7, L10 and M15 be executed before multisequence dependent instruction N1 can be executed, the symbol 100 is placed in field 125 of instruction N1 when it is initially stored in main memory 112.

Each end of sequence instruction has the following functions: It tells one of the processing elements to (1) read the related multisequence dependent instruction out of the main memory (2) to increment the symbol in field 125 of the multisequence dependent instruction by one and (3) to replace the thus modified multisequence dependent instruction in main memory 112. It can therefore be seen that each end of sequence instruction shown herein is a special type of what is generally termed a transfer instruction.

Each end of sequence instruction has the symbol 010 in field 123 and the symbol 1011 in field 124. Therefore, each end of sequence instruction is directed to processing element C by the symbol 010 in field 123 and processing element C recognizes that this is an end of sequence instruction by the symbol 1011 in field 124. Each end of sequence instruction has in field 127 and 128 the program tag and address symbols which designated the corresponding multisequence dependent instruction. Each end of sequence instruction has in field 129 the address symbol decremented by one of the corresponding multisequence dependent instruction. The reason for this will become apparent later. FIGURE 12*b* shows the information in the various fields of end of sequence instruction K7. For clarity, the program tag and address symbols in fields 121, 122, 127, 128 and 129 are shown as letters and decimal numbers which correspond to the designations of the correspondending instructions in FIGURE 12*a*.

As will be explained in detail later, when processing element C receives an end of sequence instruction, it requests that the system read the corresponding multisequence dependent instruction from main memory 112 and when processing element C receives the corresponding multisequence dependent instruction from the memory, it increments the symbol in field 125 of the multisequence dependent instruction by one. Processing element C then replaces the altered multisequence dependent instruction into the main memory 112 and places the program tag and address symbol (decremented by one) of the multisequence dependent instruction in its own register 285C. Processing element C then activates line 283C thereby requesting another instruction and requesting (by the information in its register 285D) that the system transfer the multisequence dependent instruction from main memory 112 to instruction ready memory 113. However, unless the symbol in field 125 of the multisequence dependend instruction has been increased to 111 detector 227 and gate 225 prevent the multisequence dependent instruction from being transferred from main memory 112 to the instruction ready memory 113.

Since the symbol in field 125 of each multisequence instruction is the binary number 111 decreased by one for each end of sequence instruction which must be performed before the particular multisequence dependent instruction can be performed, and since each end of sequence instruction is effective to increment the symbol in field 125 of the corresponding multisequence dependent instruction by one, after each of the end of sequence instructions which relates to a particular multisequence dependent instruction has ben performed, the symbol in field 125 of the particular multisequence dependent instruction will have been increased to the binary number 111 and hence the multisequence dependent instruction can be transferred from main memory 112 to instruction ready memory 113.

The above operations will now be described with reference to the particular example which is shown in FIGURE 12*a*. Each of the end of sequence instructions K7, L10 and M15 is transferred to instruction read memory 113 and sent to processing element C in the normal manner. These instructions direct processing element C to (1) read the multisequence dependent instruction N1 from main memory (2) increment the symbol in field 125 of the multisequence dependent instruction by one (3) replace the thus altered multisequence dependent instruction in main memory and (4) request that the multisequence dependent instruction N1 be transferred from main memory 112 to instruction ready memory 113. Multisequence dependent instruction N1 has the symbol 100 in field 125. As each of the end of sequence instructions K7, L10 and M15 is executed, the symbol in field 125 of the multisequence dependent instruction N1 is increased by one. Though an attempt is made to transfer the multisequence instruction N1 from main memory 112 to instruction ready memory 113 after each end of sequence instructions K7, L10 and M15 is individually executed, detector 227 and gate 225 prevent multisequence dependent instruction N1 from being transferred from main memory 112 to instruction ready memory 113 until all three of the end of sequence instructions K7, L10 and M15 have been executed.

The above has described how a plurality of instruction sequences can be combined into one instruction sequence. This may be termed fanning-in instruction sequences. Naturally, the reverse procedure can also be performed by the present system. That is, one instruction in a sequence of instructions may tell one of the processing elements to transfer a plurality of instructions from memory 112 to instruction ready memory 113. This may be termed fanning-out instruction sequences.

It should also be understood that a "program," which in general consists of a large number of instructions organized to accomplish some particular function may include a plurality of instruction sequences. As the system is executing the program, these instruction sequences may fan-out and fan-in according to the organization of the program so as to effectuate the purpose of the particular program.

*Detailed description of the components of the system instruction ready memory sequence control 300*

Figure 5:
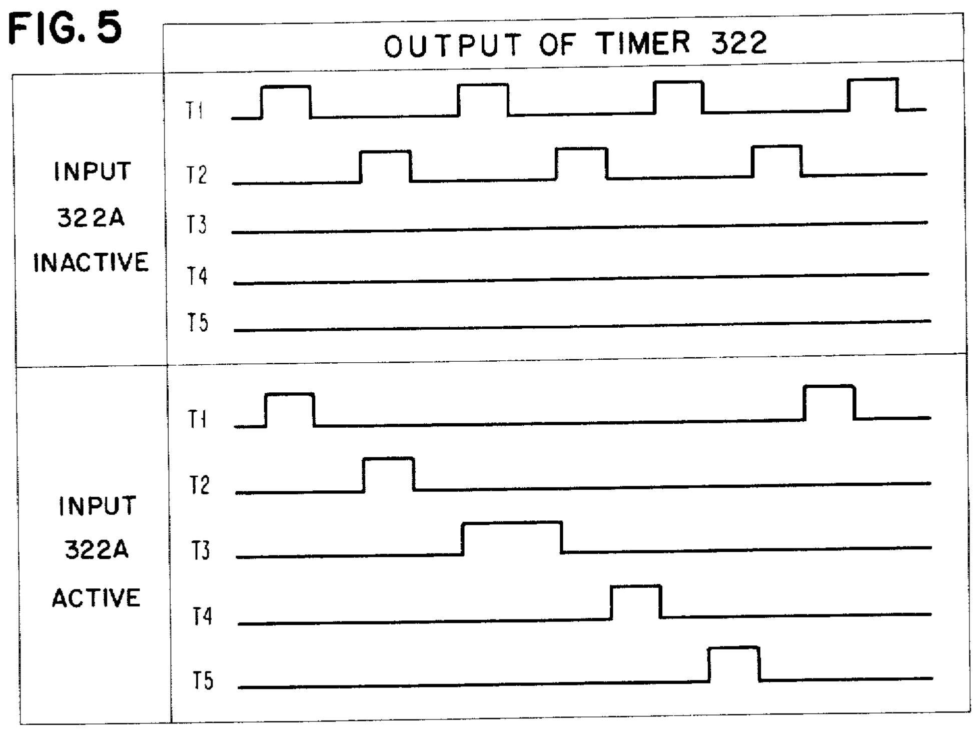
FIGURE 5 is a timing diagram which shows the output of the timer shown in FIGURE 3.

The details of the instruction ready memory sequence control 300 are shown in FIGURES 3 and 5. The instruction ready memory sequence control 300 performs the following functions: First, when a plurality of processing elements simultaneously request instructions from the instruction ready memory 113, the instruction ready memory sequence control 300 determines the sequence in which the request from the processing elements are handled. Second, after it has determined which particular processing element will be given access to the instruction ready memory 113 at a particular time, the instruction ready memory sequence control 300 generates and inserts in field 123 of interrogation register 301 the "type of element" symbol which identifies the type of instruction which can be executed by the processing element then being given access to the instruction ready memory. Third, the instruction ready memory sequence control 300 activates one of the lines 210A to 210E to indicate the particular processing element which is being given access to the instruction ready memory at a particular time. Fourth, the instruction ready memory sequence control 300 generates timing pulses T3 and T4 which time the flow of instruction words through gates 209A to 209E into the instruction registers 287A to 287E of processing elements A to E, and which activate instruction ready access control line 304A (T3) which controls the readout of the instruction ready memory 113.

Instruction ready memory sequence control 300 consists of a five position ring circuit 310, five AND gates 311A to 311E, five flip-flop circuits 312A to 312E, four code generating circuits 314, 315, 316 and 317, two OR circuits 319 and 320, a gate circuit 321 and a five position timer 322. The time relationship of the signals on the various outputs of timer 322 are shown by the chart of FIGURE 5. As shown in FIGURE 5, if timer input 322A is not activated when the timer arrives at position "two," the timer returns to position "one" without activating outputs T3, T4 and T5.

The five outputs 310A to 310E of the ring circuit 310 are sequentially activated, only one output being active at any one time. Each time the ring circuit 310 receives a pulse on line 310G (T2) from position T2 of the timer 322, the ring circuit 310 is advanced one position. The details of the structure of ring circuit 310 are not given herein since such circuits are well known in the art.

Each of the AND circuits 311A to 311E receives three inputs (1) an input from an associated stage of ring circuit 310 (2) an input from one of the lines 283A to 283E and (3) an input from position T1 of the timer 322. If the three inputs to one of the AND circuits 311A to 311E are simultaneously active, the corresponding output 311AA to 311EE is activated.

The particular instruction request which is honored by instruction ready memory 113 at any particular time is determined by selection ring 310 and AND circuits 311A to 311E. Since ring circuit 311 is advanced one position each time the timer arrives at state T2, a different one of the lines 283A to 283E is interrogated during each T1 period.

When one of the outputs 311AA to 311EE is activated, the corresponding latch circuits 312A to 312E is set to the one condition and the output of the particular latch circuit is activated. The latch circuits 312A to 312E assure that the inputs to the remainder of the circuit remain steady during an entire sequence of operation of the timer 322. Any one of the latches 312A to 312E which is set to the "on" condition by one of the lines 311AA to 311EE is reset to the zero condition when the timer 322 reaches position T5.

Each of the outputs from latch circuits 312A to 312E does three things. First, it activates one of the lines 210A to 210E which indicate which particular processing element is being given access to the instruction ready memory 113 at the particular time. Second, it activates one of the code generating circuits 314 to 317, and third it activates OR circuit 320 which in turn activates inputs 322A of timer 322 thereby causing the timer 322 to go through all of the five stages T1 to T5 instead of reverting to stage T1 after it reaches stage T2.

Each of the code generating circuits 314 to 317 generates a three digit binary number which in field 123 of an instruction word identifies a particular type of processing element. The output of any code generator which is activated is gated through gate 321 at T2 time to field 123 of the interrogation register 301.

Both latch circuits 312A and 312B activate code generator 314 through OR circuit 319. The reason for this is that both processing element A and processing element B have identical capabilities and hence instructions which they can perform are represented by the same type of element code in field 125 of an instruction word.

The particular type of element codes generated by code generating circuits 314 to 315 are shown in FIGURE 1*b*. No further details of code generating circuits 314 to 315 are given since such circuitry is well known in the art.

The time relationship between the various outputs of timer 322 is shown in FIGURE 5. It should be noted that there are two possible sequences. If line 322A is not activated, only lines T1 and T2 are sequentially activated and lines T3, T4 and T5 are never activated whereas if line 322A is activated, the timer sequences through a full cycle from T1 to T5. Since line 322A is only activated when one of the lines 285A to 285E is found to be active, it can be seen that the timer 322 only goes through a full cycle T1 to T5 when an instruction request is being executed.

*Main memory sequence control 400*

Figure 4B:
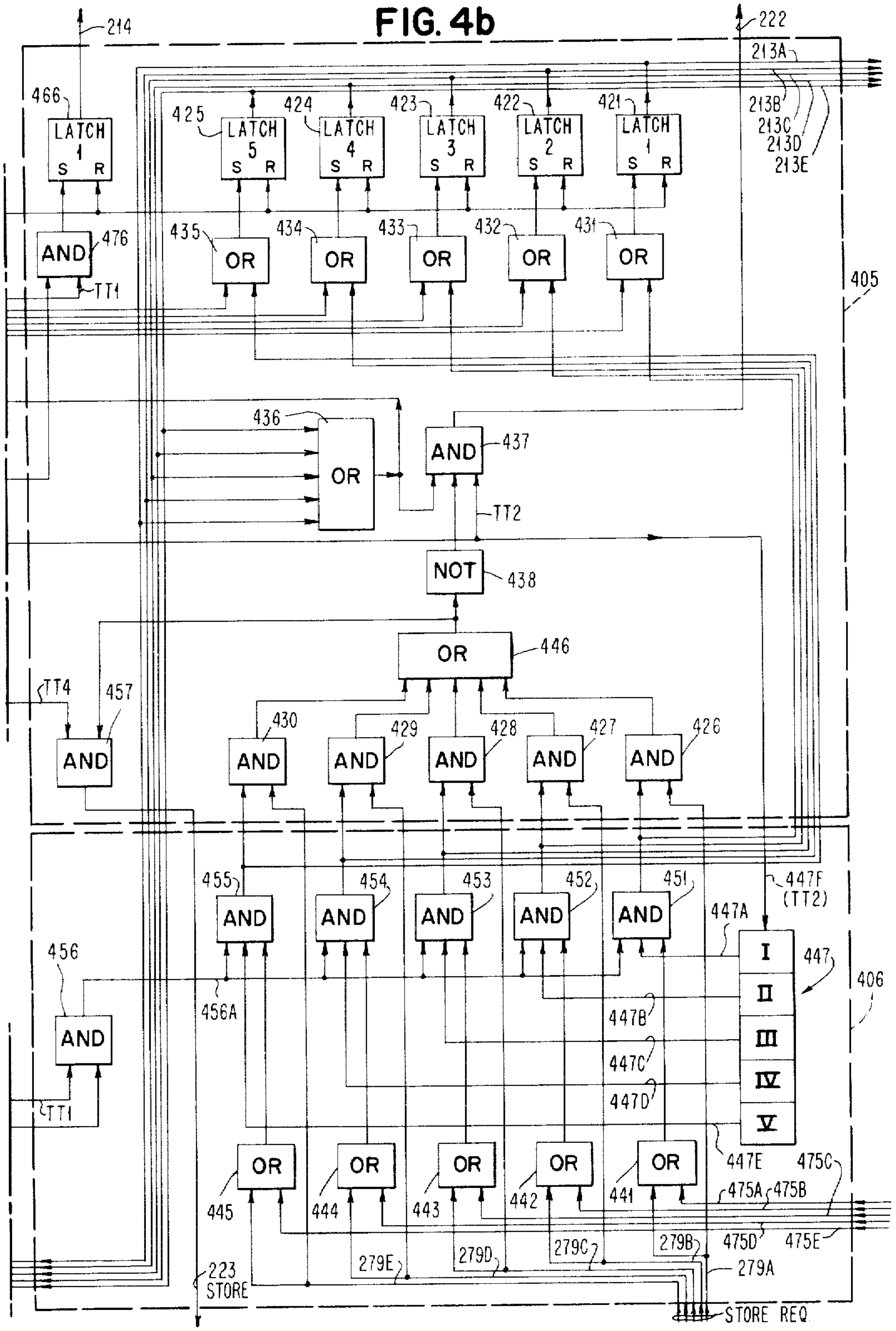
Figure 6:
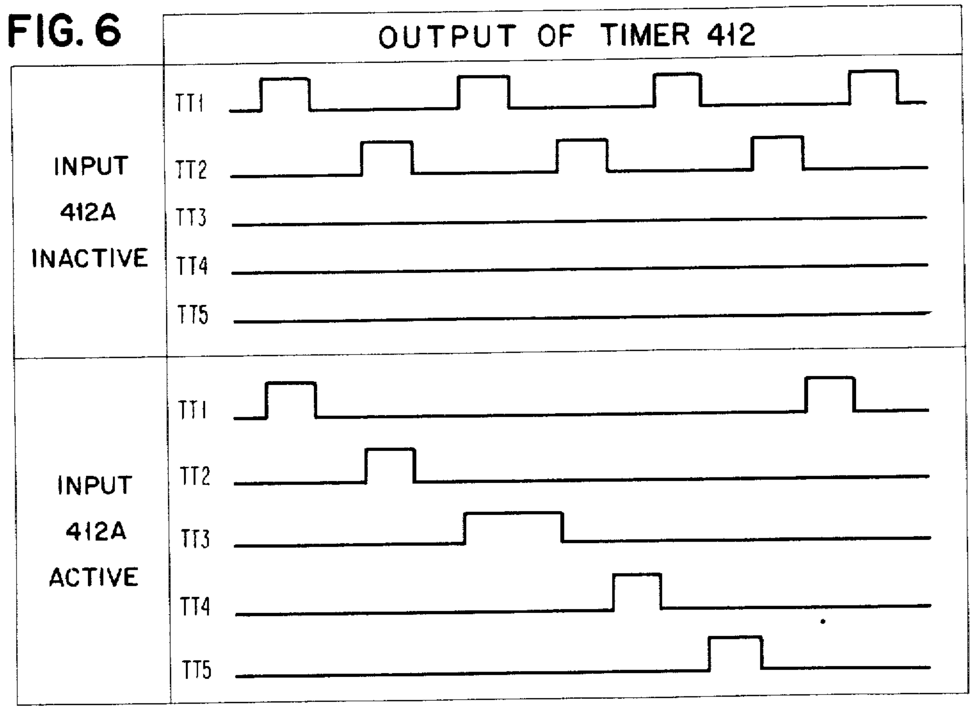
FIGURE 6 is a timing diagram which shows the output of the timer shown in FIGURE 4*a*.

The main memory sequence control 400 is shown in block form in FIGURE 2*a* and in detail in FIGURES 4*a*, 4*b* and 6. The main memory sequence control 400 receives (1) requests on lines 275A to 275E for the interrogation of main memory 112 for data words desired by processing elements A to E, (2) requests on lines 279A to 279E for access to main memory 112 so that information in register 286 of one of the processing elements A to E may be stored in main memory 112 and (3) requests on lines 202A to 202E for the transfer of instructions from main memory 112 to the instruction ready memory 113. Requests (1) above are called "readout requests," requests (2) above are called "storage requests" and requests (3) are called "instruction transfer requests." If the main memory sequence control 400 receives a plurality of requests at one particular time, it determines the particular order in which the various requests will be executed. In order to keep as much of the system operating as possible, instruction transfer requests are given priority over other types of requests.

Main memory sequence control 400 includes a timer 412 and three major groups of circuits 405, 406 and 407. As previously explained, irrespective of whether an instruction transfer operation, a data storage operation, or a data readout operation is being performed, main memory sequence control 400 activates one of the output lines 213A to 213E to indicate which particular processing element is being given access to main memory 112 at the particular time.

Output lines 213A to 213E are selectively activated by circuit 405. Circuit 405 also generates the other outputs necessary to execute the various requests. Circuit 405 is activated by circuits 406 and 407. "Readout" requests and "storage requests" from the various processing elements go to circuit 406 through lines 275A to 275E and 279A to 279E. If more than one such request is received at one time, circuit 406 determines the particular order in which the readout requests and storage requests are executed.

Instruction transfer requests go to circuit 407. If more than one instruction transfer is received at any particular time, circuit 407 determines the order in which the requests are executed. An interlock is provided between circuit 407 and circuit 406 so that if at any particular time there is an instruction transfer request, it has priority over readout requests and storage requests received by circuit 406.

The main memory sequence control 400 also includes timer 412 which has an input 412A and five outputs TT1 to TT5. The time relationship between the signals on the various outputs of timer 412 is shown in FIGURE 6. When input 412A is active, the outputs TT1 and TT2 are sequentially activated and outputs TT3, TT4 and TT5 are never activated. When input 412A is active, the five outputs TT1, TT2, TT3, TT4 and TT5 are sequentially activated. The length of time which each output is maintained active is dictated by the length of time required to accomplish all of the functions which are performed during the particular time period. For convenience in illustration herein, all of the timer periods except TT3 are shown to be identical in length. Naturally, it should be understood that the length of time certain outputs are active can be shortened or lengthened depending upon the operations being performed during the particular time period.

Circuit 405 includes five latch circuits 421 to 425 and five OR circuits 431 to 435. Latch circuits 421 to 425 respectively activate the five output lines 213A to 213E. Latch circuits 421 to 425 are respectively activated by the output of OR circuits 431 to 435. Each of the OR circuits 431 to 435 has two inputs, one of which comes from circuit 405 and one of which comes from circuit 407, hence, the output of each of the OR circuits 431 to 435 may be activated (and latch circuits 421 to 425 may be set to the on condition) by either circuit 402 or circuit 403.

Circuit 405 includes AND circuits 426 to 430, 437, 457 and 476, OR circuits 436 and 446, NOT circuit 438 and latch circuit 466. These circuits activate (in a manner which will be explained later), outputs 214, 222 and 223.

Circuit 406 includes six OR circuits 441 to 446, a ring circuit 447 and six AND circuits 451 to 456. The output of AND circuit 56 is only activated when there are no instruction transfer requests pending and hence, when circuit 405 is ready to receive a request from circuit 406 (how AND circuit 456 is activated will be explained later). Ring circuit 447 has five outputs 447A to 447E and an input 447F (TT2). The outputs 447A to 447E are sequentially activated, only one output being active at any particular time. Each time input 447F (TT2) is activated, the particular output then active is deactivated and the next output is activated. OR circuits 441 to 445 each have one input from the set of inputs 275A to 275E and one input from the sets of inputs 279A to 279E. Each of the AND circuits 451 to 455 has three inputs. One input of each AND circuit is activated by line 456A, one input of each AND circuit is activated by one of the lines 447A to 447E, and the third input to each AND circuit is activated by the output of one of the OR circuits 441 to 445.

The function of ring circuit 447 is to sequentially scan the outputs of OR circuits 441 to 445. Thus, if the output of more than one of the OR circuits 441 to 445 is active at any one particular time, only one of the outputs is effective to activate the output of one of the AND circuits 451 to 455. Hence, only one request for access to memory is transmitted from circuit 406 to circuit 405 at any one time.

Circuit 407 includes five latch circuits 461 to 465. When more than one instruction transfer request is pending, latch circuits 461 to 465 hold these requests until executed. The signals on lines 212A to 212E which initiated the requests may be terminated before the requests are executed and the latch circuits 461 to 465 remember the requests until they are executed. Circuit 407 also includes three sets of AND circuits, each set having five AND circuits. The first set of AND circuits, i.e. AND circuits 471 to 475, are used to selectively reset latch circuits 461 to 465 at the correct time, the second set of AND circuits, i.e. AND circuits 481 to 485 are used (in a manner which will be explained) to insure that circuit 405 only receives one instruction transfer request from circuit 407 at any particular time, and the third set of AND circuits i.e. AND circuits 491 to 495 is used to time flow of signals from circuit 407 to circuit 405. Circuit 407 also includes a ring circuit 466, two OR circuits 467 and 468, and NOT circuit 469.

Instruction transfer requests which are received on lines 212A to 212E respectively set latch circuits 461 to 465 thereby selectively activating the outputs of the latch circuits. The output of each of the latch circuits 461 to 465 activates one of the inputs to one of the AND circuits 481 to 485. The other input to each of the AND circuits 481 to 485 is activated by one of the outputs of ring circuit 466.

Ring circuit 466 has five outputs 466A to 466E which are sequentially activated, only one output being active at any one particular time. Ring circuit 466 also has an input 466F (TT2). Each time the input 466F (TT2) is activated, the particular output which was previously active is deactivated and the next output is activated. The function of ring circuit 466 is to sequentially scan the outputs of latching circuits 461 to 465, and if more than one of the latch circuits is active at any one particular time, only the output of one selected latch circuit is allowed to pass through AND circuits 481 to 485. Each of the AND circuits 491 to 495 receives one input from one of the AND circuits 481 to 485 and one input from output TT1 of timer 412. The function of AND circuits 491 to 495 is to insure that the outputs of circuit 403 are gated to circuit 405 at the proper time.

OR circuit 468 has five inputs one of which is connected to the output of each of the AND circuits 481 to 485, hence, the output of OR circuit 468 is activated whenever the output of any one of the AND circuits 481 to 485 is activated.

OR circuit 467 has five inputs one of which is connected to the output of each of the latch circuits 461 to 465. The output of OR circuit 467 activates the input of NOT circuit 469. The output of NOT circuit 469 is activated whenever the input to the NOT circuit 469 is not activated; hence, the output of NOT circuit 469 is active whenever none of the outputs of latch circuits 461 to 465 is activated. The activation of the output of NOT circuit 469 therefore indicates that there are no requests for instruction transfer pending and that circuit 406 can activate circuit 405 in order to execute a readout request or a data storage request. The output of NOT circuit 456 activates one input of AND circuit 456.

Each of the latch circuits 461 to 465 has a reset input which is connected to the output of one of the AND circuits 471 to 475. Each of the AND circuits 471 to 475 has two inputs, one of which is connected to output of one of the latch circuits 421 to 425. The function of AND circuits 471 to 475 is to reset one particular latch circuit 461 to 465 after the instruction transfer operation which the particular latch circuit initiated is completed. Since circuit 407 may simultaneously receive a plurality of instruction transfer requests and since a plurality of the latch circuits 461 to 465 may be simultaneously set, AND circuits 471 to 475 insure that only the particular latch circuit, the output of which was gated through AND circuits 481 to 485 at time TT1 will be reset at time TT5.

The manner in which circuit 405 activates outputs 214, 222 and 223 will now be explained. Likewise, the functions of AND circuits 426 to 430, 437, 457, 476, OR circuits 436 and 446, NOT circuit 438 and latch circuit 466 will be explained.

AND circuits 426 to 430 each have two inputs and an output. One input for each of the AND circuits 426 to 430 is connected to one of the outputs of one of the circuits 451 to 455 and the other input to each of the AND circuits 426 to 430 is connected to one of the storage request lines 279A to 279E. OR circuit 446 has five inputs which are respectively the outputs of AND circuits 426 to 430. Hence, the output of OR circuit 446 is activated whenever the outputs of one of the AND circuits 426 to 430 is activated. Since, as previously explained, one of the outputs of AND circuit 451 to 455 will only be activated when the system is performing either a readout request or a data storage request and since one of the lines 279A to 279E will only be activated when a data storage request is pending, the output of OR circuit 446 will only be activated when the system is performing a data storage request.

The input to NOT circuit 438 is activated by the output of OR circuit 446. Hence, the output of NOT circuit 438 will only be active when the system is not performing a data storage request.

AND circuit 457 has two inputs. One of the inputs is connected to the output of OR circuit 446 and the other input is connected to the TT4 output of timer 412. When both of the inputs to AND circuit 457 are active, AND circuit 457 activates line 223 which indicates that a data storage request is being performed. The input of AND circuit 457 which is connected to the output timer 412 insures that line 223 will only be activated at the correct time and input of AND circuit 457 which is connected to the output of OR circuit 446 insures that output 223 will only be activated when the system is performing a data storage operation.

AND circuit 476 has two inputs one of which is connected to the output of OR circuit 468 and one of which is connected to output TT1 of timer 412. The function of AND circuit 476 is to insure that the output of OR circuit 468 is gated to latch 466 at the correct time. Latch circuit 466 is activated by the output of AND circuit 476, the output of latch 466 activates output line 214. Output line 214 is activated at time (TT1) whenever one of the AND circuits 481 to 485 has an output. A signal on line 214 as previously explained indicates that an instruction transfer operation is being performed.

AND circuit 437 has three inputs and one output. The output of AND circuit 437 activates line 222. One input to AND circuit 437 is activated by the output of OR circuit 436 whenever the output of any one of the latch circuits 421 to 425 is active. The second input to AND circuit 437 is activated by the output of NOT circuit 438 whenever the output of OR circuit 466 indicates that a data storage request is not being executed. The third input to AND circuit 437 is activated by output TT2 of timer 412. Hence, output 222 is activated by AND circuit 437 at time TT2 whenever either a readout request or an instruction transfer request is being executed. As previously explained, AND circuit 457 activates output 223 whenever a data storage request is being executed.

The overall operation of main memory sequence control 400 will now be explained. Instruction transfer requests received on lines 212A to 212E activate latch circuits 461 to 465. Through the action of ring circuit 466, the outputs of latch circuits 461 to 465 are sequentially scanned and if one of the latch circuits is active its output is gated at time TT1 to circuit 405. If the output of one of the latch circuits 461 to 465 is active, the outputs of circuit 406 are disabled through the action of OR circuit 467, NOT circuit 469, and AND circuit 456. Whenever the output of one of the latch circuits 461 to 465 is gated through AND circuits 481 to 485, OR circuit 468 is activated and the output of latch circuit 466 is activated at time TT1 thereby activating line 214 which indicates that an instruction transfer operation is being performed.

If the output of NOT circuit 469 is activated indicating that there are no instruction transfer requests pending, any data storage requests or readout requests which are then pending are gated from circuit 406 to circuit 405. Circuit 406 receives readout requests on lines 275A to 275E and data storage requests on lines 279A to 279E. Whenever a data storage request is being performed, the output of OR circuit 446 is activated which in turn activates the output of AND circuit 457 at time TT4 thereby activating line 223 which indicates that a data storage request is being performed. The output of OR circuit 446 also activates the input of NOT circuit 438 in circuit 405 thereby disabling one of the inputs to AND circuit 437 and deactivating output line 422. The function of line 422 was previously explained.

Ring circuit 447 sequentially scans the outputs of OR circuits 441 to 445. If the output of more than one of the OR circuits 441 to 445 is active at any one time, the outputs from the active OR circuits are sequentially gated through AND circuits 451 to 455 to circuit 405 at different TT1 time periods.

Circuit 405 receives instruction transfer requests from circuit 407 and data storage and readout requests from circuit 406 and in response thereto activates the appropriate line 213A to 213E to indicate the particular processing element which is being given access to main memory 112 at any particular time. Since the outputs from AND circuits 451 to 455 and the outputs from AND circuits 481 to 485 are gated to circuit 405 at time TT1, latch circuits 421 to 425 are activated at time TT1. Latch circuits 421 to 425 are reset at time TT5. Whenever the output of one of the latch circuits 421 to 425 is activated, the output of OR circuit 436 is activated, thereby activating one of the inputs to AND circuit 437. The second input to AND circuit 437 is activated by the output of NOT circuit 438 and the third input to AND circuit 437 is connected to output 412 at timer TT2. Hence, output 222 of AND circuit 437 is only activated at time TT2 whenever the output of one of the latch circuits 421 to 425 is activated and the outputs of OR circuit 446 is not activated thereby indicating that either an instruction transfer or a readout request is being executed.

*Details of processing element A*

As previously stated, processing element A is capable of performing addition and multiplication. Processing element A is shown in block form in FIGURE 2*c* and in detail in FIGURES 7*a* and 7*b*.

As shown in FIGURE 1*b*, instruction words which have the binary symbol 110 in their field 123 are capable of being performed by processing element A. It should be noted that these same instructions may also be performed by processing element B. Irrespective of whether an instruction is a multiplication instruction or an addition instruction, it has the symbol 110 in field 123. However, a multiplication instruction has the symbol 1011 in field 124 and an addition instruction has the symbol 0111 in field 124.

Each addition instruction has in addition to the symbol 1011 in field 124 three address symbols in field 127, 128 and 129. The address symbol in field 127 is the address symbol which identifies the data word in main memory which contains the augend, the address symbol in field 128, is the address symbol which identifiies the data word in main memory which contains the addend, and the address symbol in field 129 is the address symbol which is inserted in field 132 of the same data word as the sum when the sum is stored in the main memory 112. Each data word which contains either an addend, an augend or a sum also has in field 131 the same program tag as is in field 121 of the addition instruction.

Each multiplication instruction has, in addition to the symbol 0111 in field 124, three address symbols in fields 127, 128 and 129. The address symbol in field 127 identifies the data word in main memory which contains the multiplier, the address symbol in field 128 identifies the data word in main memory which contains the multiplicand, and the address symbol in field 129 is the address symbol which is to be inserted in field 132 of the data word which contains the product when the product is stored in main memory 113. Naturally, each of the data words which contain either a multiplier, a muliplicand, or a product also has in field 131 the same program tag as the particular instruction which is being executed has in field 121.

A multiplication operation or an addition operation begins after (1) the main system places an instruction word in instruction register 287A of processing element A and (2) the main system activates input line 281A to indicate to processing element A that an instruction has been placed in instruction register 287A and (3) the main system activates lines 276A to reset buffer 285A. After the above operations occur, processing element A begins operating upon the instruction which is in instruction register 287A. The operations which occur in processing element A are best understood with reference to Tables I and II below which set out the sequences of operations which occur in processing element A.

As shown in FIGURE 7*a*, processing element A has an adder unit 710 for performing addition and a multiplier unit 720 for performing multiplication. Adder unit 710 has an augend input register 711, an addend input register 712 and a sum output register 713. If an augend is placed in register 711, and an addend is placed in register 712 after a certain period of time the sum of the two numbers appears on register 713. Such circuitry is well known in the art and no further details thereof will be given herein.

The multiplication device 720 has a multiplier input register 721, a multiplicand input register 722 and a product input register 723. If two numbers are placed in register 721 and 722 after a certain period of time, their product appears in register 723. Such circuits are known in the art and no further explanation thereof will be given herein.

As previously explained, processing element A includes registers 285A, 286A and 287A. Register 287A is divided into the nine fields shown in FIGURE 1*c*, data input-output register 286A is divided into the three fields shown in FIGURE 1*d*, and buffer register 285A is divided into two fields similar to fields 121 and 122, shown in FIGURE 1*c*. The various fields are indicated by the numbers in parenthesis on FIGURE 7*a*. Register 285A also includes a reset circuit 753 which has an input line 276A and an output line 276AA. When line 276A is activated, register 285A is set to zero and line 276AA is activated. Such circuitry is well known and no further explanation will be given.

Processing element A includes gates and cables connected as follows:

(1) Gate 731 which gates information from field 129 of register 287A to field 132 of register 286A,
(2) Gate 734 which gates information from field 128 of register 287A through an OR circuit 735 to field 122 of register 285A,
(3) Gate 736 which gates information from field 127 of register 287A through OR circuit 735 to field 122 of register 285A,
(4) Gate 737 which gates information from field 122 of register 287A through OR circuit 735 to field 122 of register 285A,
(5) Gate 738 which controls the transfer of information from field 121 of register 287A to field 121 of register 285A,
(6) Gate 739 which controls transfer of information between field 121 of register 287A to field 131 of register 286A,
(7) Gate 740 which controls the transfer of information from field 133 of register 286A to register 712,
(8) Gate 741 which controls the transfer of information from field 133 of register 286A to register 711,
(9) Gate 742 which controls the transfer of information from field 133 of register 286A to register 722,
(10) Gate 743 which controls the transfer of information from field 133 of register 286A to register 721, and
(11) Gate 746 which controls the transfer of information from register 713 through OR circuit 747 to field 133 of register 286A,
(12) Gate 748 which controls the transfer of information from register 723 through OR circuit 747 to field 133 of register 286A.

The gate circuits and the OR circuits are not described in detail since such circuits are well known in the art.

Processing element A also includes OR circuit 751 which activates lines 275A. The operation of gates 731 to 748 and of OR circuit 751 is controlled by the timer shown in FIGURE 7*b*.

The timer shown in FIGURE 7*b* has thirteen outputs AT1, AT2, AT3, etc. The outputs of the timer are activated in two possible sequences. The first sequence includes outputs AT1, AT2, AT3A, AT4, AT5, AT6A, AT7A, AT8, AT9 and AT10 and the second possible sequence is AT1, AT2, AT3B, AT4, AT5, AT6B, AT7B, AT8, AT9 and AT10. Two AND circuits 771 and 772 which control six other AND circuits 773 to 778 determine the particular sequence of operations which the timer goes through. AND circuits 771 to 772 are controlled by the output of field 124 of register 287A. When field 124 in register 287A contains the symbol 0111, the output of AND circuit 772 is activated and the timer goes through the second sequence specified above. The details of the timer will be explained later. Two tables which explain the operations which occur in processing element A during each time period will now be given.

TABLE I

*Addition operation*

The timer shown in FIGURE 7*b* (which will be explained in detail later) activates the following outputs in the following sequence during an addition operation: AT1, AT2, AT3A, AT4, AT5, AT6A, AT7A, AT8, AT9, AT10. The sequence begins if AND circuit 771 detects the symbol 1011 in field 124 of register 287A (which indicates an addition instruction) after the main system activates reset line 276A and line 283A to indicate respectively that register 285A has been reset and that an instruction has been received. The following operations occur in response to the activation of the various timer outputs.

(1) During time period AT1:
  (a) Gate 738 is conditioned to transfer the information from field 121 of register 287A to field 121 of register 285A.
  (b) Gate 736 is conditioned to transfer the information from field 127 of register 287A through OR circuit 735 to field 122 of register 285A.
(2) During time period AT2:
  (a) An input to OR circuit 751 is activated in order to activate line 275A thereby requesting from main memory 112 the data word identified by the information in register 285A.
(3) During time period AT3A (after the system activates line 281A to indicate that the requested data has been received):
  (a) Gate 741 is conditioned to transfer the information from field 131 of register 286A to register 711.
(4) During time period AT4:
  (a) Gate 734 is conditioned to transfer the address symbol from field 128 of register 287A through OR gate 735 to field 122 of register 285A. (Note the information from field 121 of register 287A which was placed in field 121 of register 285A during step one above is still in register 285A.)
(5) During time period AT5:
  (a) An input to OR circuit 755 is activated in order to activate data request line 275A thereby requesting from main memory 112 the data word identified by the information in register 285A.
(6) During time period AT6A (after the system has activated line 281A to indicate that the requested data has been received):
  (a) Gate 740 is conditioned to transfer the information from field 133 of register 286A to register 712.
(7) During time period AT7: (Note there is sufficient time between step 6 and step 7 in order that the addition may be performed by adder unit 710)
  (a) Gate 746 is conditioned to transfer the information from register 713 through OR circuit 747 to field 133 of register 286A.
  (b) Gate 739 is conditioned to transfer the information from field 121 of register 287A to field 131 of register 286A.
  (c) Gate 731 is conditioned to transfer the information from field 129 of register 287A to field 132 of register 286A.
(8) During time period AT8:
  (a) Output line 297A is activated thereby requesting the system to store in main memory 112 the data word in register 286A.
(9) During time period AT9 (after the system has activated line 281A to indicate that the data in register 286A has been stored in the memory):
  (a) Gate 737 is conditioned to transfer the information from field 122 of register 287A through OR circuit 735 to field 122 of register 285A. (Note the information from field 121 of register 287A which was placed in field 121 of register 285A during step one above is still in register 285A).

(10) During time period AT10:
  (a) Activate output 283A thereby requesting another instruction and initiating an instruction transfer operation.

TABLE II

*Multiplication operation*

The timer shown in FIGURE 7*b* (which will be explained in detail later) activates the following outputs in the following sequence during a multiplication operation: AT1, AT2, AT3B, AT4, AT5, AT6B, AT7B, AT8, AT9, and AT10. The sequence begins if AND circuit 722 detects the symbol 0111 in field 124 of register 287A (which indicates a multiplication instruction) after the main system activates reset line 276A and line 283A to indicate respectively that buffer 285 has been reset and that an instruction has been received. The following operations occur in response to the activation of the various timer outputs.

(1) During time period AT1:
  (a) Gate 738 is conditioned to transfer the information from field 121 of register 287A to field 121 of register 285A. (Note during subsequent operations the information placed in register 285A during this operation remains therein.)
  (b) Gate 736 is conditioned to transfer the information in field 127 of register 287A to field 122 of register 285A.
(2) During time period AT2:
  (a) An input to OR circuit 751 is activated in order to activate output 275A thereby requesting from memory 112 the word identified by the information in register 285A.
(3) During time period AT3B: (After the main system has activated line 281A to indicate that the requested data has been received.)
  (a) Gate 743 is conditioned to gate the information from field 133 of register 286A to register 721.
(4) During time period AT4:
  (a) Gate 734 is conditioned to transfer the information from field 128 of register 287A to field 122 of register 285A.
(5) During time period AT5:
  (a) An input or OR circuit 751 is conditioned to activate output line 275A thereby requesting from memory the word identified by the information in register 285.
(6) During time period AT6B: (After the system has activated input lines 281A to indicate that the requested data has been received.)
  (a) Gate 742 is conditioned to transfer the information from field 133 of register 286A to register 722.
(7) During time period AT7B: (By this time the multiplication has been performed.)
  (a) Gate 748 is conditioned to transfer the information from register 723 to field 133 of register 286A.
(8) During time period AT8:
  (a) Line 279A is activated thereby requesting the system to store in main memory 112 the data word in register 286.
(9) During time period AT9: (After the system has activated line 281A to indicate that the requested store operation has been performed.)
(a) Gate 737 is conditioned to transfer the information from field 122 of register 287A through OR circuit 735 to field 122 of register 285A.
(10) During time period AT10:
  (a) Activate output line 283A thereby requesting another instruction and initiating an instruction transfer operation.

The details of the timer shown in FIGURE 7*b* will now be explained. The timer includes ten bistable triggers 761 to 770. Each trigger has an output which is active when the trigger is in a first state and inactive when the trigger is in the second state. Each trigger has a set input identified by the letter "S," activation of which sets the trigger to the first state and a reset input identified by the letter "R," activation of which sets the trigger to the second state. Stated differently, the output of a trigger is activated when the set input is activated and the output is deactivated when the reset input is activated.

Four AND circuits 781 to 784 and six delay circuits 791 to 796 control the turn on and turn off of the various triggers. The output of trigger 761 is turned on through AND circuit 781 when line 282A is activated by the system to indicate that an instruction has been received by processing element A and when line 276AA has been activated by the buffer reset circuit 753 to indicate that that register 285A has been reset to zero. A fixed time period after trigger 761 is turned on, the output of delay circuit 791 resets trigger 761 and sets trigger 762. Trigger 763 is set by AND circuit 782 after trigger 762 is set and the system activates lines 281A to indicate that the requested data has been received. Triggers 764 and 765 are sequentially set and triggers 763 and 764 are sequentially reset by delay circuits 792 and 793. Trigger 766 is set by AND circuit 776 a certain time after trigger 765 has been set and after the main system activates line 281A. Trigger 767 and 768 are sequentially set and triggers 766 and 767 are sequentially reset by delay circuit 794 and 795. Trigger 769 is set by AND circuit 784 after trigger 768 has been set and the main system activates line 281A to indicate that the request data has been stored. Trigger 769 is reset and trigger 770 is set by delay circuit 796. The output of AND circuit 781 also resets trigger 770. The time delay introduced by each of the delay circuits 791 to 796 is sufficient to allow the necessary operations in processing element A to occur.

For clarity of illustration, no connections are shown in the drawings from the outputs of trigger 761 to 770 and the outputs of AND circuits 773 to 778 to certain of the gates which these outputs control. Showing these connections on the drawings would serve no purpose since the connections are completely defined by the designations on the various lines and by the description in the specification.

*Details of processing element C*

As previously stated, processing element C is capable of performing logical operations. FIGURE 9 shows some of the circuitry in processing element C. All of the logical operations which processing element C is capable of performing are not all specified herein. Processing element C could be designed to perform logical operations such an ANDing, ORing, complementing, incrementing, etc.

As previously stated, processing element C executes the end of sequence instructions which alter the sequence combining field 125 in the associated multisequence dependent instruction. FIGURE 9 is a flow diagram of the circuitry in processing element C which executes end of sequence instructions. Since the particular circuitry in processing element C which executes the other logical operations is well known and is not relevant to the present invention such other circuitry is not shown herein.

As shown in FIGURE 12*b*, end of sequence instructions have the symbol 010 in field 123 and the symbol 1011 in field 124. End of instructions have the normal type of information in fields 121 and 122 and hence they are transferred in the usual maner form main memory 112 to instruction ready memory 113 after the execution of the preceding instruction in the same instruction sequence is completed. End of sequence instructions are also read out of instruction ready memory 113 in the usual manner. That is, after processing element C has completed a particular instruction it requests another instruction from instruction ready memory 113. Instruction ready memory 113 then determines if there is an instruction therein which has the symbol 010 in field 123. If there is one such instruction it is read out of memory 113 and sent to processing element C. If there is more than one instruction in instruction ready memory 113 which has the symbol 010 in field 123 a particular one of these instructions is selected in accordance with the priority information in field 126 and the length of time the particular instruction has been in the instruction ready memory. The selected instruction is sent to processing element C as in the case when only one such instruction was in the memory. If the particular instruction sent to processing element C has the symbol 1011 in its field 124 it indicates that the particular instruction is an end of sequence instruction and processing element C then performs the steps outlined below in Table III in order to execute the end of sequence instruction.

As shown in FIGURE 9 processing element C has gates 931, 932, 933, 937 and 938, OR circuit 935, incrementor 936, and timer 921 in addition to the previously described registers 285C, 286C and 287C.

As previously stated each end of sequence instruction has the program tag and address symbol of the associated multisequence dependent instruction in fields 127 and 128 and it has the address symbol of the associated multisequence dependent instruction decremented by one in field 129. When processing element C receives an end of sequence instruction from the system, it (1) requests the associated multisequence dependent instruction from memory (2) after it receives the multisequence dependent instruction it increments the symbol in field 125 of the multisequence dependent instruction by one (3) it then stores the thus altered multisequence dependent instruction in main memory 112 and (4) before it requests another instruction it places the program tag of the multisequence dependent instruction in field 121 of register 285C and it places the address symbol decremented by one of the multisequence dependent instruction in field 122 of register 285C so that when another instruction is requested, the system attempts to transfer the multisequence dependent instruction from main memory 112 to instruction ready memory 113.

When timer 921 detects the symbol 0111 in field 124 of register 287C after the system has activated line 282C to indicate that an instruction has been received and after the system has activated line 276C to reset register 285C, the timer 921 sequentially activates the seven timer outputs CT1 to CT7, thereby executing the end of sequence instruction. The particular operation switch occur during each of the time periods CT1 to CT7 are set forth below in Table III.

TABLE III

*Execution of an end of sequence instruction*

The timer 921 activates the following outputs in the following sequence during the execution of an end of sequence instruction: CT1, CT2, CT3, CT4, CT5, CT6 and CT7. The sequence begins if timer 921 detects the symbol 0111 in field 124 of register 287A after main memory activates line 276C and line 283C to respectively reset register 285C and to indicate that an instruction has been received. The following operations occur during each of the above time periods.

(1) During time period CT1:

(a) Gate 931 is conditioned to transfer the information from field 127 of register 287C to field 121 of register 285C.

(b) Gate 932 is conditioned to transfer the information from field 128 of register 287C to field 122 of register 285C.

(2) During time period CT2:

(a) Activate line 275C to request that the main memory transfer to register 286C the data word identified by the information in register 285C.

(3) During time period CT3 (After the main system activates line 291C to indicate that the requested data has been received.):

(a) Gate 938 is conditioned to transfer the information from field 133 to register 286C to incrementor 936 (note the incrementor 936 increases the symbol in field 125 of the word by one).

(4) During time period CT4:

(a) Gate 837 is conditioned to transfer the information from incrementor 936 to field 133 of register 285C (note the information which was in fields 131 and 132 of register 286D when the system placed the word in register 286C is still there).

(5) During time period CT5:

(a) Activate line 279C thereby requesting that the system store the information in register 286B into the main memory.

(6) During time period CT6: (When the system has activated line 291C to indicate that the information has been stored in the memory).

(a) Gate 931 is conditioned to transfer the information from field 127 of register 287C to fields 121 of register 285C.

(b) Gate 933 is conditioned to transfer the information from field 129 of register 287 to field 122 of register 285C.

(7) During time period CT7:

(a) Activate the instruction request line 283C.

The details of incrementor 936, timer 921, and the various gates shown in FIGURE 9 is not explained in detail herein since circuitry which performs the functions defined for the various circuits are well known in the art. These circuits form no part of the present invention and hence no purpose would be served by giving detailed explanations of the circuits.

The part of processing element shown in detail herein has very limited capabilities (i.e., it is only capable of executing an end of sequence instruction. Naturally, following the same pattern as developed herein, processing element C could have other varied capabilities. Other circuitry could be provided in processing element C such that different symbols in field 124 of an instruction which has the symbol 010 in field 123 would effectuate various other logical operations.

*Details of processing element D*

FIGURE 8 shows a flow diagram of processing element D. As shown in FIGURE 1*b*, processing element D has input-output capabilities. The particular part of processing element D which is shown in FIGURE 8 is that part of processing element D which performs instructions which indicate that certain words are to be read from main memory 113 onto a tape or instructions which indicate that certain words are to be read from a tape into the main memory 112.

As shown in FIGURE 8 processing element D has in addition to the registers 285D, 286D and 287D which were previously discussed, a tape unit 805, a timer 821, a counter 822, a compare circuit 839, a tape unit input-output buffer register 824, gate circuits 829 to 838 and OR circuits 840 and 841.

When processing element D receives an instruction word which has the symbol 0111 in field 124 it indicates that certain information is to be taken from main memory 112 and that this information is to be stored on tape. This is called a memory output instruction. Memory output instructions have the following information in their operand fields: field 128 contains the program tag of the words which are to be read from memory, field 127 contains the address symbol of the first word which is to be taken from memory, and field 129 contains the address of the last word which is to be taken from memory. The details of how a memory output instruction is executed is given in Table IV below.

When processing element D receives an instruction word which has the symbol 0111 in field 124 it indicates that certain information is to be read from the tape and stored in main memory 112. This is called a memory input instruction. Memory input instructions have the following information in their operand fields: field 128 contains the program tag which is to be stored in field 131 of the word which is stored in memory, field 127 contains the address symbol which is to be stored with the first word stored in memory, and field 129 contains the address symbol which is to be stored with the last word stored in memory 112. The first word read from the tape is stored in the main memory with the address symbol contained in field 127 of the memory input instruction in field 132. Succeeding data words are stored in memory, the address symbol of the words being incremented by one until the address symbols equal the address symbol contained in field 129 of the instruction word. The details of how the memory input instructions are executed is explained in Table V below.

TABLE IV

*Take information from main memory 112 and store it on tape*

The timer shown in FIGURE 7*b* activates the following outputs in the following sequence during a memory output operation: DT1, DT2, DT3B, DT4B, DT5B, DT6B, DT7 and DT8. The sequence begins if timer 821 detects the symbol 1011 in field 124 of register 287A after the main system activates lines 276A and 283A to indicate respectively that register 285A has been reset and that an instruction has been received. The following operations occur during each of the above time periods.

(1) During time period DT1:

(a) Gate 830 is conditioned to transfer the contents of field 124 of register 287D to timer 821.

(b) Gate 831 is conditioned to transfer the contents of field 127 of register 287D to counter 822.

(2) During time period DT2B: (note output DT2 is also activated at this time).

(a) Activate line 805A to advance the tape one word.

(b) Gate 829 is conditioned to transfer the contents of fields 128 of register 287D through OR circuit 841 to field 121 of register 285D.

(c) Gate 835 is conditioned to transfer the contents of counter 822 through OR circuit 840 to field 122 of register 285D.

(3) During time period DT3B:

(a) Activate line 275D to request access to main memory.

(b) Decrement counter 822 one position.

(4) During time period DT4B: (After the main system activates line 291D to indicate that the data has been received.)

(a) Gate 838 is conditioned to transfer the contents of field 133 of register 286D to tape buffer register 824.

(5) During time period DT5B:

(a) Activate tape unit input 805B to transfer from tape buffer register onto the tape.

(6) During time period DT6B:

(a) Initiate the re-execution of the above cycle starting with step two unless the compare circuit indicates counter 822 has reached the value stored in field 129 of register 287D.

(7) During time period DT7: (When the compare circuit indicates that the counter has reached the value stored in field 129 of register 287D.)

(a) Gates 833 and 834 are conditioned to transfer address symbol and program tag from field 121 and 122 of instruction register 287D to fields 121 and 122 of register 285D.

(8) During time period DT8:

(a) Activate instruction word request line 283D.

TABLE V

*Take information from the tape and store it in the main memory 113*

The timer shown in FIGURE 7*b* activates the following outputs in the following sequence during a memory input operation: DT1, DT2A, DT3A, DT4A, DT5A, DT6A, DT7, and DT8. The sequence begins if timer 821 detects the symbol 0111 in field 124 of register 287A after main system activates line 276A and line 238A to indicate respectively that register 285A has been reset and that an instruction has been received. The following operations occur during each of the above time periods.

(1) During time period DT1:

(a) Gate 830 is conditioned to transfer the contents of field 124 of register 287D to timer 821.

(b) Gate 831 is conditioned to transfer the gate contents of field 127 of register 287D to counter 822.

(2) During time period DT2A: (note output DT2 is also actuated at this time).

(a) Gate 836 is conditioned to transfer the contents of counter 822 to field 132 of register 286D.

(b) Gate 829 is conditioned to transfer the contents of field 128 of register 287D to field 131 of register 286D.

(3) During time period DT3A:

(a) Tape unit input 805C is activated to read from tape to tape buffer register.

(4) During time period DT4A:

(a) Gate 837 is conditioned to read from tape buffer register to field 133 of register 286D.

(5) During time period DT5A:

(a) Activate line 279D to indicate that the word stored in register 286D should be stored in the main memory.

(b) Decrement counter 822 by one position.

(6) During time period DT6A: (When the main system activates line 281D to indicate that the word has been stored in memory.)

(a) Initiate the re-execution of the above cycle starting with step two unless the compare circuit 839 indicates the counter 822 has reached the value stored in field 129 of register 287D.

(7) During time period DT7: (When the compare circuit 839 indicates that the counter has reached the value stored in field 129 of register 287D.)

(a) Gates 833 and 834 are conditioned to transfer the contents of fields 121 and 122 of register 287D into field 121 and 122 of register 285.

(8) During time period DT8:

(a) Instruction request line 283D is activated.

The details of tape unit 805, counter 822, and compare circuit 839 are not discussed in detail since such units are well known in the art and the specific construction of these units forms no part of the present invention.

Timer 821 which controls the sequencing of the operations of processing element D is not shown in detail herein since such timers are well known in the art and since a similar timer is shown in FIGURE 7*b* with respect to processing element A. Furthermore, for clarity of illustration as was done in FIGURES 7*a* and 7*b*, no connections are shown between the outputs of timer 821 and the various gates to which these outputs are connected. The interconnections, are however, clearly indicated in the figures by the designations on the various lines and the interconnections are clearly described in the specification.

As shown and described herein processing element D has very limited capabilities. Processing element D can merely read from one tape unit into the main memory 112 or from the main memory 112 into the one tape unit. Naturally following the same pattern as developed herein, processing element D could have other varied capabilities.

As shown herein instructions which have the symbol 001 in field 123 can be performed by processing element D and these instructions can have the symbol 1011 or the symbol 0111 in their field 124. Other circuitry could be provided in processing element D such that other symbols in field 125 could be used to control other and varied operations. For example, there could be a plurality of different tape units wherein information could be stored or from which information could be read or an instruction could cause a particular tape unit to move forward or backward a certain specified number of positions without reading any information into or out of the memory. Furthermore, other input-output elements such as card readers, or typewriters, etc. could be connected into the system.

Counter 822, registers 285D, 286D and 287D and tape unit 805 can be manually set to any desired values and timer 821 has an input marked start. In order to start the system operating upon a particular program a memory input instruction is manually placed in register 287D, counter 822 is manually set to a prespecified value, and the program (i.e., the sequence of instruction words) and the associated data is placed in the tape unit 805. The start input of timer 821 is then activated thereby beginning the cycle of operations specified in Table IV starting with time period two. The program is thereby read into the memory and at the end of the read-in operation the first instruction is transferred from main memory 112 to instruction ready memory 113 in the usual fashion. The above operations naturally could be handled by a supervisory program.

*Processing elements B and E*

The details of the circuitry in processing elements B and E is not shown herein since the details of the circuitry in these processing elements is irrelevant to the present invention. The present invention does not relate to the specific construction of the various processing elements. Such elements are well known in the art and various of the computers which are commercially available could be adapted by one skilled in the art to perform the functions herein set out for the processing elements A to E. The present invention relates to the particular manner in which the various processing elements are interrelated. Hence, the specific details of the various processing elements is not pertinent to the present invention. Some details of three elementary processing elements, i.e., processing elements A, C and D were described to show the general type of processing element which may be connected into the system of the present invention. Naturally, more complicated processing elements than those shown herein could be included in the system.

For example, the three processing elements A, C and D which were shown in some detail have a relatively simple sequence of operations controlled by a timer; however, the system could include processing elements which have stored therein subroutines so that a processing element could be made to go through a long sequence of operations by one instruction from the main system. The instructions transferred to a processing element from the main memory 112 via the instruction ready memory 113 could be used to control, initiate, or modify the subroutine stored in the processing element.

Since the present invention relates to a system for transferring instructions from a memory complex including memories 112 and 113 to a plurality of autonomous processing elements represented by processing elements A to E the particular internal construction of the various processing elements forms no part of the present invention and is not particularly relevant to the present invention. Part of the internal structure of three simple processing elements A, C and D is shown herein in some detail to better illustrate the principles of the present invention. However, the particular structure of the processing elements A, C and D forms no part of the present invention.

*Details of the add one adder 220*

FIGURE 11 shows the details of the add one adder 220 shown in FIGURE 2*a*. Add one adder 220 has an input bus 220A, an output bus 220B and a control line 214. When control line 214 is inactive, address symbols received on input bus 220A are transmitted unchanged to output bus 220B and when control line 214A is activated address symbols received on input bus 220A are incremented by one and then supplied to output bus 220B.

Add one adder 220 consists of two gates 910 and 911, OR circuit 912, NOT circuit 913 and adder circuitry 915. When control line 214 is not activated, NOT circuit 913 opens gate 910 and address symbols received on input bus 220A pass through OR circuit 912 to output bus 220B. When control line 214 is activated gate 911 is open and address symbols received on input bus 220A are fed to adder circuitry 915 where they are incremented by one. The incremented address symbol then passes through OR circuit 912 to output bus 220B.

The details of the circuitry in the adder 915 are not shown herein since the details of particular circuitry forms no part of the present invention and since such circuitry is well known in the art.

*SUMMARY (See FIGURES 2a to 2e)*

The embodiment of the invention shown herein includes two memories 112 and 113 and five processing elements A to E. Interrogation of memory 112 is controlled by the main memory sequence control 400 and the interrogation of the memory 113 is controlled by instruction ready memory sequence control 300.

The system is capable of operating upon a plurality of independent instruction sequences or independent programs. The programs which the system is to execute are stored in memory 112. Each instruction word in each program has the field specified in FIGURE 1*c*. These include:

(1) Field 121 which indicates the program with which the particular instruction is associated.
(2) Field 122 which indicates the location in the associated program of the particular instruction word.
(3) Field 123 which indicates what type of processing element is needed in order to execute the particular instruction.
(4) Field 124 which indicates the operation which is to be performed.
(5) Field 126 which indicates the priority of the particular program.
(6) Three fields 127, 128 and 129 which contain operand symbols.

At any one time only one instruction in each independent instruction sequence is capable of being executed (the instructions in each instruction sequence must be executed sequentially). The instructions which are ready for execution at any particular time are stored in instruction ready memory 113. When an instruction becomes ready for execution the instruction is transferred from main memory 112 to instruction ready memory 113. Hence, after each instruction is executed the next instruction in the same sequence of instructions is transferred from main memory 112 to instruction ready memory 113.

Each of the processing elements A to E has a line 283A to 283E which it activates when it is idle. Instruction ready memory sequence control 300 sequentially scans the lines 283A to 283E to find processing elements which are idle. When instruction ready memory sequence control 300 finds a processing element which is idle, it places the symbol which in field 123 of an instruction word indicates an instruction which can be executed by that type of element in interrogation register 301. Line 304A (T3) is then activated and a determination is made if there are any instructions in instruction ready memory 113 which can be executed by the processing element then requesting an instruction. If more than one such instruction is in instruction ready memory 113 the instruction with the highest priority symbol in field 126 is read out.

After an instruction is read out of instruction ready memory 113 this instruction is sent to the particular processing element which requested the instruction. The processing element then proceeds to executie the instruction independent of the rest of the system. While the processing element is executing the instruction the other processing elements may be interrogating instruction ready memory 113 to find if there are any instructions therein which they can execute.

After a processing element has completed executing an instruction it places the program tag and address symbol of the instruction which it executed in its register 285A. When instruction ready memory sequence control 300 interrogates memory 113 to find if there is an instruction therein which the particular processing element can execute it also activates the appropriate line 210A to 210E which in turn activates the appropriate line 212A to 212E. When one of the lines 212A to 212E is activated, main memory sequence control 400 gates the program tag and address symbol in register 285 of the appropriate processing element to interrogation register 401 of memory 112. The address symbol is gated through add one adder 220 which increments the address symbol by one. Thus the program tag and address symbol placed in interrogation register 401 is the program tag and address symbol which identifies the next instruction in the same sequence of instructions as the instruction which was just completed by the processing element. This instruction is read out of main memory 112 to buffer 403 and then gated to instruction ready memory 113.

Processing elements A to E can request data from main memory 113 by activating lines 275A to 275E. Processing elements A to E can store information in main memory 113 by activating lines 279A to 279E. All requests for access to main memory 113 go to main memory sequence control 400. Instruction transfer requests have priority; however, if no instruction transfer requests are pending main memory sequence control 400 allows the processing elements to have access to main memory 112 so that they can either store data therein or receive data therefrom.

Each of the processing elements is given a maximum amount of independence. Once it has received an instruction it proceeds to execute this instruction without any control from the remainder of the system. Naturally, if data is required from the main memory 112 or if the processing elements desire to store information in main memory 112 they must wait until the memory is free.

One particular feature of the present invention which should be noted is that all information relating to the sequence and progress of each program is held in memories 112 and 113 and this information is available to each of the processing elements. Thus, the programs need not be tied to individual processing elements except during the time that a processing element is executing one particular instruction.

Each of the processing elements may work on any one of the programs which is currently in the system as the condition of the various programs require and dictate. This is in contrast to computing systems which have instruction counters in particular computing elements so that particular programs are tied, if only for a short period of time, to particular computing elements. The present invention provides an efficient multiprocessing system wherein the hardware in the system can be utilized to maximum efficiency.

*Alternate means of indicating instruction which are ready for execution*

In the embodiment of the invention shown herein, two separate memories, main memory 112 and instruction ready memory 113 are shown. The function of instruction ready memory 113 is to provide a means for indicating the particular instructions which are ready for execution at a particular time. Alternate means could be used for indicating the particular instructions which are ready for execution at a particular time without departing from the spirit of the invention.

For example in an alternate embodiment of the invention there is only one associative memory and each of the instructions has another field in addition to the fields previously described. This additional field merely consists of one bit position. If this particular bit position in an instruction is set to the one condition, it indicates that the particular instruction is ready for execution, whereas if this particular bit position is set to the zero condition it indicates that the instruction is not ready for execution. The bit described above is hereinafter called the "instruction ready" bit.

The alternate embodiment operates as follows: Whenever a sequence of instructions is loaded into the memory the instruction ready bit of each instruction except the first instruction in each sequence is set to zero. Whenever any processing element interrogates the memory to find an instruction which it can execute, in addition to associating upon its type of element symbol in field 123, it also associates upon a one in the instruction ready field of the various instruction words. Hence, only those instructions which the particular processing element can execute and which are ready to be executed are read out of the memory.

After a processing element completes executing an instruction and it is again given access to the memory the first operation which this element performs is to readout of memory the instruction which has the same program tag and an address symbol higher by one than the instruction which was just completed by the particular processing element. The processing element sets the instruction ready bit of this instruction to the one state and it replaces the thus modified instruction back into the memory. The processing element then associates upon its own type of element symbol in field 123 and an instruction ready bit of one. If it finds an instruction it executes it and the above sequence is then repeated as described with respect to the first embodiment of the invention.

Multisequence dependent instructions can be handled by the second embodiment of the invention similarly to the manner in which they are handled in the first embodiment of the invention previously described. However, with the second embodiment of the invention it is not necessary to interrogate the sequence combining field of a multisequence dependent instruction to determine when it is ready for execution. In the second preferred embodiment of the invention the instruction ready bit in multisequence dependent instructions is an overflow position from the multisequence dependent field. The number initially placed in the multisequence dependent field (i.e., in field 125) is one higher than the number initially placed in field 125 of multisequence dependent instructions in the first embodiment of the invention. Hence, with the second embodiment of the invention, when the number in field 125 of a multisequence dependent instruction is incremented for the last time (thereby indicating that the instruction is ready for execution) the number in field 125 will overflow into the instruction ready position, which will set the instruction ready bit to indicate that the instruction is ready for execution.

As in the first embodiment of the invention, in order to establish queing between various instructions or instruction sequences, the number stored in the priority field of selected instructions can be altered during the operation of the system as desired. Expanded queing facilities can be obtained by providing hardware within the memory itself which can alter the information stored in the priority field of instructions without reading them from the memory.

It should be understood that the present invention is directed at a system and that the invention may be practiced in any of the different component technologies. For example, the invention could be built using vacuum tube circuitry, transistor circuitry, tunnel diode circuitry, cryotronic circuitry (i.e., circuitry which includes cryotrons), magnetic cores, etc. or combinations of any of these.

As was previously explained the present invention is directed toward the interrelationship of the major components in the system. Hence, the particular components used are not relevant to the present invention. The components shown herein are merely shown for the purposes of illustration. In the interest of keeping the specification within a reasonable size, details which are well known in the art and which are not relevant to the present invention are not shown herein.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a computing system capable of simultaneously operating upon a plurality of independent sequences of instructions, each of said instructions comprising, a first field to indicate the relative position of the particular instruction in its associated sequence of instructions, a second field to indicate which class of elements can execute the particular instruction, a plurality of simultaneously operable autonomous computing elements, said computing elements being divided into several different classes, each class of elements having different computing capabilities, each computing element including means for requesting an instruction when it is idle, a memory system having a plurality of registers for storing instructions, indicating means for indicating those instructions which are logically ready for execution, means responsive to a request for an instruction from a particular computing element and to said indicating means for reading out of memory and for sending to said particular computing element an instruction which is ready for execution and which has an indication in the second field thereof, which indicates that the particular instruction can be executed by the particular computing element.

2. In a computing system capable of simultaneously operating upon a plurality of independent instruction sequences, each instruction sequence consisting of a plurality of instruction words which must be executed sequentially, said instruction words being divided into several different categories, each of said instruction words comprising a first field to indicate with which particular instruction sequence the particular instruction word is associated, a second field to indicate the relative position of the particular instruction word in its associated instruction sequence, a third field to indicate the category of the particular instruction words, a plurality of simultaneously operable autonomous computing elements, said computing elements being arranged in classes, one class of elements for each category of instruction words, each computing element in each class of computing elements being capable of executing instructions which are in the associated category of instructions, each computing element having first indicating means for indicating when it finishes executing an instruction, a memory having a plurality of registers, for storing instruction words, second indicating means responsive to said first indicating means for indicating those instructions which are ready for execution, each instruction being indicated as ready for execution after the preceding instruction in the same instruction is completed, means responsive to said first indicating means in a particular computing element and to said second indicating means for reading out of said memory and for sending to said particular computing element an instruction word which is ready for execution and the third field of which indicates that the particular processing element can execute the particular instruction.

3. In a computing system capable of simultaneously operating upon a plurality of independent instruction sequences, said instruction sequences having different priorities assigned thereto, each instruction sequence comprising a plurality of instruction words which must be executed sequentially, said instruction words being divided into several different categories, each of said instruction words comprising a first field to indicate with which particular instruction sequence the particular instruction word is associated, a second field to indicate the relative position of the particular instruction in its associated instruction sequence, a third field to indicate the category of the particular instruction, a fourth field to indicate the priority assigned to the associated instruction sequence, a memory having a plurality of registers for storing instruction words, a plurality of simultaneously operable autonomous computing elements, said computing elements being arranged in classes, one class of elements for each category of instruction words, each computing element in each class of computer elements being capable of executing instructions which are in the associated category of instructions, each computing element having means for indicating when it finishes executing an instruction, indicating means for indicating those instructions which are ready for execution, means responsive to an indication from any computing element that the particular computing element has finished executing an instruction and to said indicating means for (1) detecting all of the instruction words which are ready for execution and the third field of which indicates the particular processing element can execute the particular instructions and (2) selecting, reading out and sending to the particular processing element the one instruction word the fourth field of which indicates that the word has the highest priority of all instruction words detected.

4. In a computing system capable of simultaneously operating upon a plurality of independent instruction sequences, each instruction sequence consisting of a plurality of instruction words which must be executed sequentially, the first instruction in certain instruction sequences being a multisequence dependent instruction and the last instruction in certain instruction sequences being an end of sequence instruction, a plurality of end of sequence instructions being associated with each multisequence dependent instruction, each of said multisequence dependent instructions being incapable of execution before all the associated end of sequence instructions are executed, said instruction words being divided into several different categories, each of said instruction words comprising a first field to indicate with which particular instruction sequence the particular instruction word is associated, a second field to indicate the relative position of the particular instruction in its associated instruction sequence, a third field to indicate the category of the particular instruction, a fourth field to indicate whether the particular instruction is a multisequence dependent instruction, a memory having a plurality of registers for storing instruction words, a plurality of simultaneously operable autonomous computing elements, said computing elements being arranged in classes, one class of elements for each category of instruction words, each computing element in each class of computer elements being capable of executing instructions which are in the associated category of instructions, each computing element having instruction request means for requesting another instruction when the execution of an instruction is complete, means in one of said computing elements responsive to an end of sequence instruction for altering the fourth field of the associated multisequence dependent instruction, indicating means responsive to the information in the fourth field of an instruction, and to the instruction request means of the processing element which executes the preceding instruction which is in the same instruction sequence for indicating those instructions which are ready for execution, means responsive to an indication from any computing element that the particular computing element has finished executing an instruction for reading out of memory and for sending to said particular computing element an instruction word (1) the third field of which indicates the particular processing element can execute the particular instruction and (2) which said indicating means indicates is ready for execution.

5. In a computing system capable of simultaneously operating upon a plurality of independent instruction sequences, said instruction sequence having different priorities, assigned thereto, each instruction sequence consisting of a plurality of instruction words which must be executed sequentially, the first instruction in certain instruction sequences being a multisequence dependent instruction and the last instruction in certain instruction sequences being an end of sequence instruction, a plurality of end of sequence instructions being associated with each multisequence dependent instructions, said multisequence dependent instruction being incapable of execution before the associated end of sequence instructions are executed, said instruction words being divided into several different categories, each instruction word comprising a first field to indicate with which particular instruction sequence the particular instruction word is associated, a second field to indicate the relative position of the particular instruction in its associated instruction sequence, a third field to indicate the category of the particular instruction, a fourth field to indicate the priority assigned to the associated instruction sequence, a fifth field to indicate whether the particular instruction is a multisequence dependent instruction, a memory having a plurality of registers for storing instruction words, a plurality of simultaneously operable autonomous computing elements, said computing elements being arranged in classes, one class of elements for each category of instruction words, each computing element in each class of computer elements being capable of executing instructions which are in the associated category of instructions, each computing element having means for indicating when it finishes executing an instruction, means in one of said computing elements responsive to an end of sequence instruction for altering the fifth field of the associated multisequence dependent instruction, indicating means for indicating those instruction words which are ready for execution, said means being responsive to said instruction request means for indicating that the next instruction which is in the same instruction sequence as a completed instruction is ready for execution if also indicated by the information in the fifth field of the instruction, means responsive to an indication from any computing element that the particular computing element has finished executing an instruction and to said indicating means (1) for detecting all of the instruction words which are ready for execution and the third field of which indicates the particular processing element can execute the particular instructions and (2) for selecting, reading out of memory and sending to the particular processing element the one instruction word the fourth field of which indicates that the word has the highest priority of all instruction words detected.

6. In a computing system for simultaneously operating upon a plurality of independent instruction sequences, each instruction sequence comprising a plurality of instruction words which must be executed sequentially, said instruction words being divided into several different categories, each instruction word comprising, a first field to indicate with which particular instruction sequence the particular instruction word is associated, a second field to indicate the relative position of the particular instruction in its associated instruction sequence, and a third field to indicate the category of the particular instruction, a central memory having means for indicating the particular instruction in each sequence of instruction which is ready for execution, a plurality of simultaneously operable autonomous computing elements, said computing elements being arranged in classes, one class of elements for each category of instruction words, each computing element in each class of computer elements being capable of executing instructions which are in the associated category of instructions, each computing element having means for indicating when it finishes executing an instruction, means responsive to an indication from any computing element that the particular computing element has finished executing an instruction for interrogating the third field of each instruction word which said memory system indicates is ready for execution to detect an instruction word associated with the same category as the particular computing element, means for reading out the selected instruction word and sending it to the requesting computing element, whereby the processing elements can work independently on any one of a plurality of stored programs as the state of these programs requires.

7. In a computing system for simultaneously operating upon a plurality of independent instruction sequences, each instruction sequence comprising a plurality of instruction words which must be executed sequentially, said instruction words being divided into several different categories, each instruction word comprising, a first field to indicate with which particular instruction sequence the particular instruction word is associated, a second field to indicate the relative position of the particular instruction in its associated instruction sequence, and a third field to indicate the category of the particular instruction, a plurality of simultaneously operable autonomous computing elements, said computing elements being arranged in classes, one class of elements for each category of instruction words, each computing element in each class of computer elements being capable of executing instructions which are in the associated category of instruction words, each computing element having first indicating means for indicating when it finishes executing an instruction, a central memory, said memory including second indicating means for indicating the particular instruction in each sequence of instructions which is ready for execution, said second indicating means being responsive to said first indicating means, whereby said second indicating means indicates that the next instruction in the same sequence of instructions as the instruction completed by a processing element is ready for execution, means responsive to an indication from any computing element that the particular computing element has finished executing an instruction for interrogating the third field of each instruction word which said memory system indicates is ready for execution to detect an instruction word associated with the same category as the particular computing element, means for reading out the selected instruction word and sending it to the requesting computing element, whereby the processing elements can work independently on any one of a plurality of instruction sequences as the state of these instruction sequences requires and whereby the information relating to the state of any instruction sequence is contained in said central memory which is accessible to each of the computing elements.

8. In a computing system for simultaneously operating upon a plurality of independent instruction sequences, said instruction sequences having different priorities assigned thereto and each instruction sequence comprising a plurality of instruction words which must be executed sequentially, said instruction words being divided into several different categories, each instruction word comprising, a first field to indicate with which particular instruction sequence the particular instruction word is associated, a second field to indicate the relative position of the particular instruction in its associated instruction sequence, a third field to indicate the category of the particular instruction, and a fourth field to indicate the priority assigned to the associated instruction sequence, a plurality of simultaneously operable autonomous computing elements, said computing elements being arranged in classes, one class of elements for each category of instruction words, each computing element in each class of computer elements being capable of executing instructions which are in the associated category of instruction words, each computing element having a first indicating means for indicating when it finishes executing an instruction, a central memory, said memory including second indicating means for indicating the particular instruction in each sequence of instructions which is ready for execution, said second indicating means being responsive to said first indicating means, whereby said indicating means indicates that each instruction which follows in the same sequence of instructions an instruction completed by a processing element is ready for execution, means responsive to an indication from any computing element that the particular computing element has finished executing an instruction and to said second indicating means for (1) detecting all of the instruction words which are ready for execution and which are associated with the same category as the particular processing element and (2) selecting, reading from memory, and sending to the particular processing element the one particular instruction the fourth field of which indicate that the particular instruction word has the highest priority of all the instruction words detected, whereby the processing elements can work independently on any one of a plurality of instruction sequences as the state and priority of these instruction sequences requires, and whereby the information relating to the state of any instruction sequence is contained in said central memory which is accessible to each of the computing elements.

9. In a computing system capable of simultaneously operating upon a plurality of independent instruction sequences, each instruction sequence consisting of a plurality of instruction words which must be executed sequentially, the first instruction in certain instruction sequences being a multisequence dependent instruction and the last instruction in certain instruction sequences being an end of sequence instruction, a plurality of end of sequence instructions being associated with each multisequence dependent instruction, each multisequence dependent instruction being incapable of execution before the associated end of sequence instructions are executed, said instruction words being divided into several different categories, each of said instruction words comprising, a first field to indicate with which particular instruction sequence the particular instruction word is associated, a second field to indicate the relative position of the particular instruction in its associated instruction sequence, a third field to indicate the category of the particular instruction, a fourth field to indicate whether the particular instruction is a multisequence dependent instruction, a plurality of simultaneously operable autonomous computing elements, said computing elements being arranged in classes, one class of elements for each category of instruction words, each computing element in each class of computer elements being capable of executing instructions where are in the associated category of instruction words, each computing element having first indicating means for indicating when it finishes executing an instruction, means in one of said computing elements responsive to an end of sequence instruction for altering the fourth field of the associated multisequence dependent instruction, a central memory, said memory including second indicating means responsive to the information in the fourth field of an instruction and to the first indicating means of processing element which executes the preceding instruction which is in the same instruction sequence as a particular instruction for indicating the particular instruction in any sequence of instructions which is ready for execution, whereby said second indicating means indicates that the next instruction in the same sequence of instructions as the instruction completed by a processing element is ready for execution if the information in the fourth field of said instruction indicates that said instruction is ready for execution, means responsive to an indication from any computing element that the particular computing element has finished executing an instruction for interrogating the third field of each instruction word which said memory system indicates is ready for execution to detect an instruction word associated with the same category as the particular computing element, means for reading out the detected instruction word and sending it to the requesting computing element, whereby the processing elements can work independently on any one of a plurality of instruction sequences as the state of these sequences require and whereby the information relating to the state of any program and to the combination of instruction sequences is contained in said central memory which is accessible to each of the computing elements.

10. In a computing system capable of simultaneously operating upon a plurality of independent instruction sequences, said instruction sequences having different priorities assigned thereto, each instruction sequence consisting of a plurality of instruction words which must be executed sequentially, the first instruction in certain instruction sequences being a multisequence dependent instruction and the last instruction in certain instruction sequences being an end of sequence instruction, a plurality of end of sequence instructions being associated with each multisequence dependent instructions, said multisequence dependent instruction being incapable of execution before the associated end of sequence instructions are executed, said instruction words being divided into several different categories, each instruction word comprising a first field to indicate with which particular instruction sequence the particular instruction word is associated, a second field to indicate the relative position of the particular instruction in its associated instruction sequence, a third field to indicate the category of the particular instruction, a fourth field to indicate the priority assigned to the associated instruction sequence, a fifth field to indicate whether the particular instruction is a multisequence dependent instruction, a plurality of simultaneously operable autonomous computing elements, said computing elements being arranged in classes, one class of elements for each category of instruction words, each computing element in each class of computer elements being capable of executing instructions which are in the associated category of instruction words, each computing element having first indicating means for indicating when it finishes executing an instruction, means in one of said computing elements responsive to an end of sequence instruction for altering the fourth field of the associated multisequence dependent instruction, a central memory, said memory including second indicating means responsive to the information in the fifth field of an instruction and to the instruction request means of the processing element which executes the preceding instruction which is in the same instruction sequence for indicating any instruction in each sequence of instructions which is ready for execution, means responsive to an indication from any computing element that the particular computing element has finished executing an instruction for interrogating the third field of each instruction word which said second indicating means indicates is ready for execution to detect an instruction word associated with the same category as the particular computing element, means for reading out the detected instruction word and sending it to the requesting computing element, whereby the processing elements can work independently on any one of a plurality of stored programs as the state and priority of these programs requires and whereby the information relating to the state and priority of any program is contained in said central memory which is accessible to each of the computing elements, and whereby the information relating to the execution of a multisequence dependent instruction is contained in the multisequence dependent instruction itself.

11. In a computing system capable of simultaneously operating upon a plurality of independent instruction sequences, each instruction sequence consisting of a plurality of instruction words which must be executed sequentially, the first instruction in certain instruction sequences being a multisequence dependent instruction and the last instruction in certain instruction sequences being an end of sequence instruction, a plurality of end of sequence instructions being associated with each multisequence dependent instructions, each of said multisequence dependent instructions being incapable of execution before the associated end of sequence instructions are executed, said instruction words being divided into several different categories, each of said instruction words comprising,

- a first field to indicate with which particular instruction sequence the particular instruction word is associated,
- a second field to indicate the relative position of the particular instruction in its associated instruction sequence,
- a third field to indicate the category of the particular instruction,
- a fourth field, a particular prespecified number in which indicates that the instruction may be executed after the preceding instruction in the same instruction sequence is executed, said prespecified number being initially placed in the fourth field of each instruction which may be executed after the preceding instruction in the same sequence of instructions is executed, the number initially placed in the fourth field of each multisequence dependent instruction differing by a certain prespecified amount for each end of sequence instruction which must be executed before the particular multisequence dependent instruction can be executed,
- a plurality of simultaneously operable autonomous computing elements, said computing elements being arranged in classes, one class of elements for each category of instruction words, each computing element in each class of computing elements being capable of executing instructions which are in the associated category of instructions, each computing element having instruction request means for requesting another instruction when the execution of an instruction is complete,
- means in one of said computer elements responsive to an end of sequence instruction for altering the number in the fourth field of the associated multisequence dependent instruction by said prespecified amount,
- a memory having a plurality of registers for storing instruction words,
- indicating means responsive to said instruction request means for indicating that those instructions (1) which have said prespecified number in the fourth field thereof and (2) the instruction preceding which in the same instruction sequence has been executed, are ready for execution,
- means responsive to an indication from any computing element that the particular computing element has finished executing an instruction for reading out of memory and for sending to said computing element an instruction word (1) the third field of which indicates the particular processing element can execute the particular instruction and (2) which said indicating means indicates is ready for execution.

12. A computing system capable of executing a sequence of instructions comprising,

- a plurality of simultaneously operable autonomous computing elements, said computing elements being divided into several different classes, each class of elements having different computing capabilities, each computing element including means for requesting an instruction when it is idle,
- a memory having a plurality of registers for storing said instructions, each of said instructions being divided into the following fields,
  - a first field to indicate the relative position of the particular instruction in the sequence of instructions,
  - a second field to indicate the particular class of elements which can execute the particular instruction,
- indicating means for indicating any instructions in the sequence of instructions which are ready for execution at any particular time,
- associative means responsive to a request for an instruction from a particular computing element and to said indicating means for simultaneously interrogating registers in said memory for reading out an instruction which is ready for execution and which has an indication in the third field thereof which indicates that the particular instruction can be executed by the particular computing element.

13. In a computing system capable of simultaneously operating upon a plurality of independent sequences of instructions, each of said instructions comprising a first field to indicate the relative position of the particular instruction in its associated sequence of instructions, a second field to indicate which class of elements can execute the particular instructions; a plurality of simultaneously operable autonomous computing elements, said composing elements being divided into several different classes, each class of elements having different computing capabilities, each computing element including means for requesting an instruction when it is idle; a content addressable memory system having a plurality of registers for storing instructions; indicating means for indicating those instructions which are logically ready for execution; means responsive to a request for an instruction from a particular computing element and to said indicating means for content addressing said memory to locate an instruction having an indication in the second field thereof, which indicates that the particular instruction can be executed by the particular computing element.

References Cited by the Examiner

UNITED STATES PATENTS

| | | | |
|---|---|---|---|
| 3,042,903 | 7/1962 | Estrems | 340—172.5 |
| 3,063,036 | 11/1962 | Reach | 340—172.5 |

ROBERT C. BAILEY, *Primary Examiner.*